United States Patent
Fukuhara et al.

(10) Patent No.: US 8,238,434 B2
(45) Date of Patent: Aug. 7, 2012

(54) APPARATUS AND METHOD FOR PROCESSING WAVELET INFORMATION

(75) Inventors: Takahiro Fukuhara, Kanagawa (JP); Yuuki Tanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 1104 days.

(21) Appl. No.: 12/112,397

(22) Filed: Apr. 30, 2008

(65) Prior Publication Data

US 2008/0298471 A1  Dec. 4, 2008

(30) Foreign Application Priority Data

May 17, 2007 (JP) ................ 2007-131285

(51) Int. Cl.
H04N 7/12 (2006.01)
H04N 11/02 (2006.01)
H04N 11/04 (2006.01)

(52) U.S. Cl. .............. 375/240.19; 375/240.28

(58) Field of Classification Search .......... 375/130–153, 375/240.01–240.29; 704/500–504; 382/238, 382/239, 3; G10L 19/00, 21/04; H04B 1/00, H04B 1/66; H04N 7/12, 11/02, 11/04
See application file for complete search history.

(56) References Cited

U.S. PATENT DOCUMENTS

| 6,546,143 | B1* | 4/2003 | Taubman et al. | 382/240 |
| 6,873,734 | B1* | 3/2005 | Zandi et al. | 382/233 |
| 2003/0138151 | A1* | 7/2003 | Schwartz | 382/239 |
| 2007/0269122 | A1 | 11/2007 | Fukuhara et al. | |
| 2007/0286510 | A1 | 12/2007 | Fukuhara | |
| 2008/0013845 | A1 | 1/2008 | Fukuhara et al. | |
| 2008/0013846 | A1 | 1/2008 | Fukuhara et al. | |

FOREIGN PATENT DOCUMENTS

| JP | 10-283342 | 10/1998 |
| JP | 11-239060 | 8/1999 |
| JP | 2002-101310 | 4/2002 |

OTHER PUBLICATIONS

Pamela Cosman et al., "Memory Constrained Wavelet Based Image Coding", IEE Signal Processing Letters, Vol. 5, No. 9, Sep. 1998, pp. 221-223.*
U.S. Appl. No. 11/814,257, filed Jul. 18, 2007, Takahiro Fukuhara, et al.
Wim Sweldens, "The Lifting Scheme: A Custom-Design Construction of Biorthogonal Wavelets", Applied and Computational Harmonic Analysis, vol. 3, No. 2, Article No. 0015, 1996 pp. 186-200.
Christos Chrysafis et al., "Line Based, Reduced Memory, Wavelet Image Compression", IEEE Transactions on Image Processing, vol. 9, No. 3, Mar. 2000, pp. 378-389.

* cited by examiner

Primary Examiner — Gims Philippe
Assistant Examiner — Brent R Lindon
(74) Attorney, Agent, or Firm — Oblon, Spivak, McClelland, Maier & Neustadt, L.L.P.

(57) ABSTRACT

An inverse wavelet transformer causes a level-graded buffer to store one of two lines of coefficient data generated through a synthesis filtering operation. In order to adjust an output timing of image data, the inverse wavelet transformer causes an output buffer to store temporarily the other line of the two lines of coefficient data in a period throughout which the output buffer stores no baseband image data and then causes the level-graded buffer to store the other line of the two lines of coefficient data. In this way, the level-graded buffer stores coefficients generated through the synthesis filtering operation on a line-by-line basis.

10 Claims, 29 Drawing Sheets

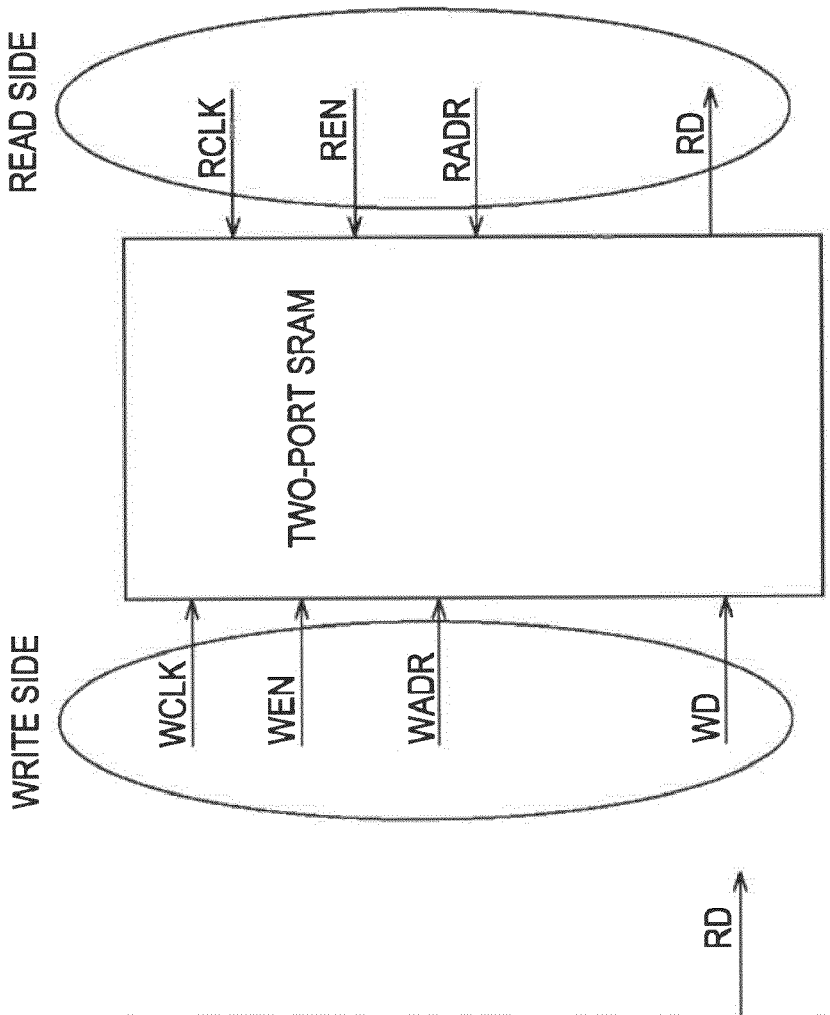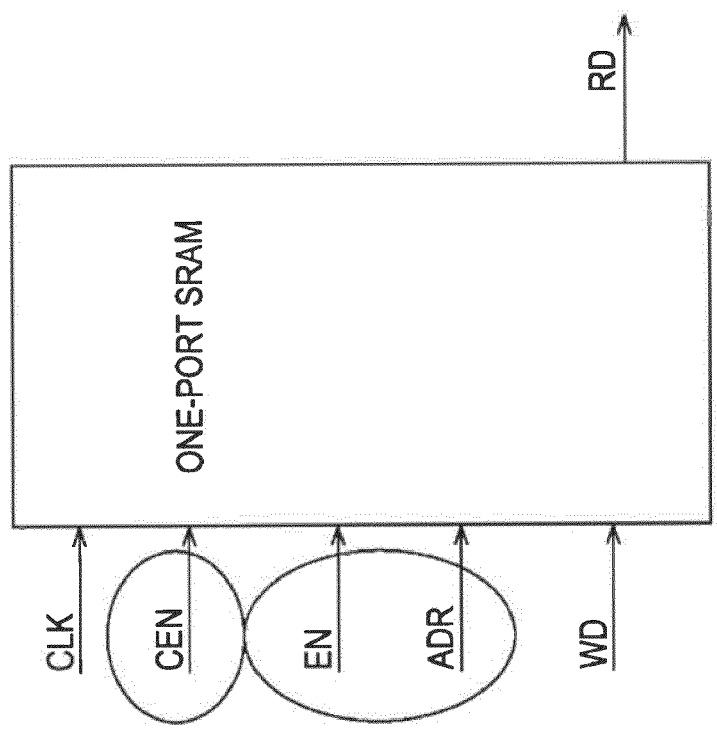

APPARATUS AND METHOD FOR PROCESSING WAVELET INFORMATION

CROSS REFERENCES TO RELATED APPLICATIONS

The present invention contains subject matter related to Japanese Patent Application JP 2007-131285 filed in the Japanese Patent Office on May 17, 2007, the entire contents of which are incorporated herein by reference.

BACKGROUND OF THE INVENTION

1. Field of the Invention

The present invention relates to an information processing apparatus and an information processing method and, in particular, to an information processing apparatus and an information processing method for reducing a memory capacity used as a buffer memory for storing data in inverse wavelet transform.

2. Description of the Related Art

Joint Photographic Experts Group (JPEG) and JPEG2000, formulated by the International Organization for Standardization (ISO), are available as typical image compression methods. In accordance with the JPEG standards, discrete cosine transform (DCT) is used and, it is known that if a relatively high number of bits is assigned, good encoded and decoded images result.

Methods of segmenting an image into a plurality of bands using a filter bank including a high-pass filter and a low-pass filter and encoding the image on a per band basis have been currently actively studied. The wavelet transform encoding draws attention as a new technique superseding the DCT because the wavelet transform encoding is free from block noise at high compression rate characteristic of the DCT transform.

JPEG2000 standardized January 2001 adopts a combination of the wavelet transform and highly efficient entropy encoding (bit modeling by bit plane and arithmetic coding) and provides a marked improvement in encoding efficiency in comparison with JPEG.

In a wavelet transform process, such as the one disclosed in Japanese Unexamined Patent Application Publication No. 10-283342, image data is input and a horizontal filtering operation and a vertical filtering operation are performed on the input image data while the image data is stepwise segmented into a low-frequency component.

Image data is wavelet transformed into coefficient data (frequency component). The wavelet transformed coefficient data is inverse wavelet transformed into original image data. The inverse wavelet transform restores finally the original image by performing a synthesis filtering operation on a high-frequency component and a low-frequency component from the top segmentation level to the lowest segmentation level.

In the inverse wavelet transform, coefficient data in the middle of processing, and finally obtained image data are temporarily stored on a buffer memory.

SUMMARY OF THE INVENTION

An increase in a memory capacity leads to an increase in the scale of apparatuses and the manufacturing costs of the apparatuses. A small memory capacity is required of buffer memories.

If a large memory capacity required of the buffer memory increases, a high-speed but small-memory capacity cache memory arranged in a processor performing inverse wavelet transform is not sufficient as the buffer memory. An external memory working at a low speed may be used as the buffer memory. During the inverse wavelet transform, data reading and data writing operations are frequently performed on the buffer memory. The use of a low-speed external memory as the buffer memory can lead to a decrease in the process speed of the inverse wavelet transform.

It is thus desirable to reduce a memory capacity of the buffer memory storing data in the inverse wavelet transform with improved usage efficiency of the buffer memory.

In accordance with one embodiment of the present invention, an information processing apparatus, includes a synthesis filtering unit for performing a synthesis filtering operation on image data so that frequency components of the image data at frequency bands at the same segmentation level are synthesized, the image data containing a plurality of frequency bands of a high-frequency component and a low-frequency component as a result of an analysis filtering operation performed in a layer fashion, a frequency component storage unit for storing, until the synthesis filtering unit performs a next synthesis filtering operation, frequency components being synthesis filterable and at a one-notch lower segmentation level at which the synthesis filtering unit synthesizes frequency components in frequency bands at the same segmentation level, an image data storage unit for storing, until an output timing of the image data, the image data generated and restored by the synthesis filtering unit as a result of the synthesis filtering operation, and a control unit for causing the synthesis filtering unit to perform recursively the synthesis filtering operation on the frequency components stored on the frequency component storage unit, causing the frequency storage unit to store a part of the frequency components generated by the synthesis filtering unit, causing the image data storage unit to store the other part of the frequency components and then causing the frequency component storage unit to store the other part of the frequency component after the synthesis filtering unit completes the synthesis filtering operation on the part of the frequency component.

The synthesis filtering unit may include a vertical synthesis filtering unit for performing the synthesis filtering operation on the frequency components of the image data in an image vertical direction, and a horizontal synthesis filtering unit for performing the synthesis filtering operation on the frequency components of the image data in an image horizontal direction.

The control unit may cause the synthesis filtering unit to perform the synthesis filtering operation on the frequency component stored on the frequency component storage unit with a higher priority.

The control unit may cause the synthesis filtering unit to perform the synthesis filtering operation on a frequency component at a lower segmentation level with a higher priority, from among the components stored on the frequency component storage unit.

The synthesis filtering unit may generate two lines of the frequency components at a one-notch lower segmentation level by synthesizing lines of the frequency components in the frequency bands at the same segmentation level, and the control unit may cause the frequency component storage unit to store one of the two lines generated by the synthesis filtering unit and cause the image data storage unit to store the other line.

The control unit may cause one of the two lines of the image data generated in the synthesis filtering operation by the synthesis filtering unit to be output to the outside and cause the other of the two lines to be stored on the image data storage unit until a next output timing.

The control unit may cause the image data storage unit to store the other line of the frequency components generated by the synthesis filtering unit during a period throughout which no image data is stored on the image data storage unit, and move the frequency components from the image data storage unit to the frequency component storage unit at the timing another line of the image data generated by the synthesis filtering unit is stored onto the image data storage unit.

The image data storage unit may include a storage unit for writing and reading data via one-port connection, a data concatenation unit for concatenating a plurality of pieces of data consecutively supplied and storing the concatenated data as a single piece of data onto the storage unit, and a data deconcatenation unit for deconcatenating the single piece of data into a plurality of pieces of data and outputting consecutively the plurality of pieces of data. The control unit causes the data concatenation unit and the data deconcatenation unit to perform alternately a read operation and a write operation onto the storage unit by a predetermined data unit.

The frequency component storage unit may store separately the frequency components on a per segmentation level basis.

In accordance with one embodiment of the present invention, an image processing method, includes steps of performing a synthesis filtering operation on image data so that frequency components of the image data at frequency bands at the same segmentation level are synthesized, the image data containing a plurality of frequency bands of a high-frequency component and a low-frequency component as a result of an analysis filtering operation performed in a layer fashion, storing onto a frequency component storage unit a part of frequency components, the frequency components being synthesis filterable and at a one-notch lower segmentation level at which frequency components in frequency bands at the same segmentation level are synthesized in the synthesis filtering operation, and storing another part of the frequency component onto an image data storage unit, performing recursively the synthesis filtering operation on the frequency components stored on the frequency component storage unit until the image data is restored, storing on the image data storage unit, until an output timing of the image data, the image data generated and restored in the synthesis filtering operation, and moving the frequency component from the image data storage unit to the frequency component storage unit when the image data is stored onto the image data storage unit.

In accordance with embodiments of the present invention, the synthesis filtering operation is performed on the image data so that the frequency components of the image data at frequency bands at the same segmentation level are synthesized. The image data contains the plurality of frequency bands of the high-frequency component and the low-frequency component as a result of the analysis filtering operation performed in a layer fashion. The frequency component storage unit stores the part of frequency components, the frequency components being synthesis filterable and at the one-notch lower segmentation level at which the frequency components in the frequency bands at the same segmentation level are synthesized in the synthesis filtering operation. The image data storage unit stores the other part of the frequency component. The synthesis filtering operation is performed recursively on the frequency components stored on the frequency component storage unit until the image data is restored. Until an output timing of the image data, the image data generated and restored in the synthesis filtering operation is stored on the image data storage unit. The frequency component is moved from the image data storage unit to the frequency component storage unit when the image data is stored onto the image data storage unit.

In accordance with embodiments of the present invention, the memory capacity required to store data in the inverse wavelet transform is reduced.

BRIEF DESCRIPTION OF THE DRAWINGS

FIGS. 11A and 11B illustrate an input-output terminal of each of a typical one-port SRAM and a typical two-port SRAM;

DESCRIPTION OF THE PREFERRED EMBODIMENTS

Wavelet transform is described first.

In the wavelet transform, image data is segmented into a high spatial frequency region and a low spatial frequency using analysis filters. The analysis filters include a horizontal analysis filter performing an analysis filtering operation on the image data in a horizontal direction and a vertical analysis filter performing an analysis filtering operation on the image data in a vertical direction. The image data is thus segmented into four regions (subbands) by performing the analysis filtering operation once in each of the two directions. In the wavelet transform, the horizontal analysis filtering operation and the vertical analysis filtering operation are recursively repeated on each of the two lower spatial frequency subbands in the horizontal direction and the vertical direction (namely, repeated in a layer fashion). Segmentation is recursively repeated to result in low-frequency data in spatial frequency.

Figure 1:
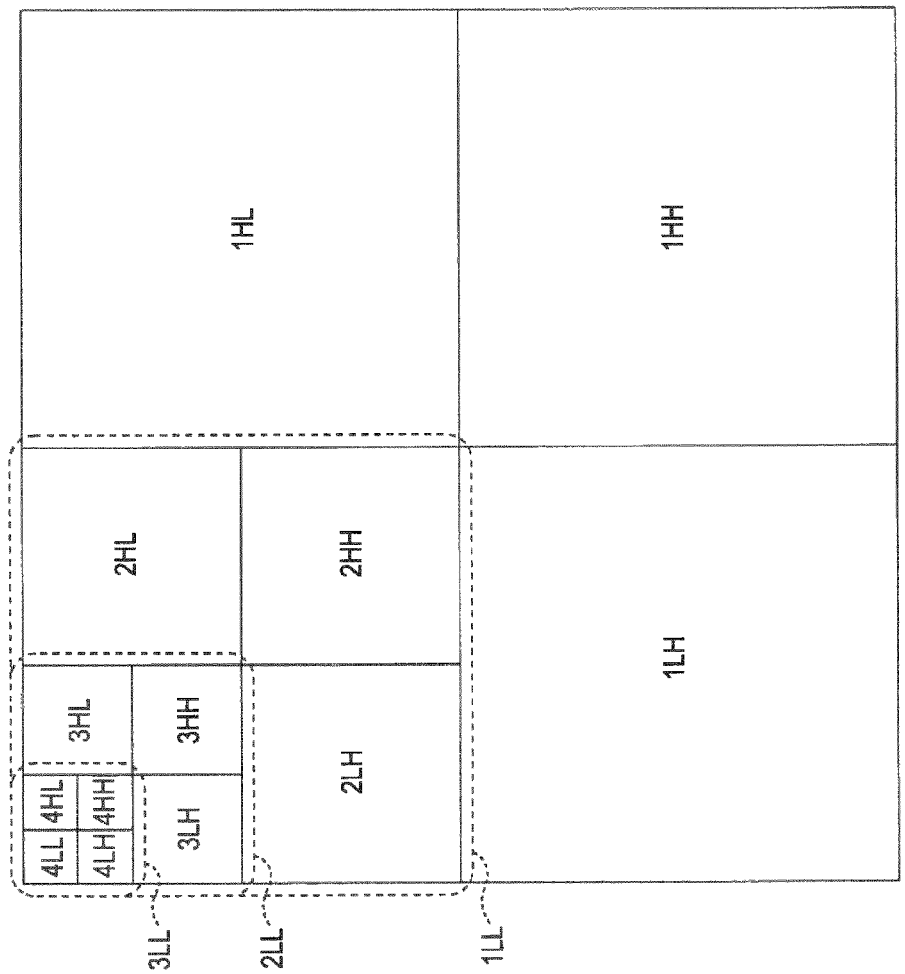
FIG. 1 diagrammatically illustrates wavelet transform.

FIG. 1 diagrammatically illustrates the analysis filtering operation that has been repeated by four times. The horizontal and vertical analysis filtering operations are repeated recursively by four times, a frequency component of the image data of one picture is segmented into thirteen subbands in a layer structure. Data of each subband, i.e., image data of a baseband is segmented into a frequency component on a per frequency band basis. The resulting frequency component of the baseband is referred to as coefficient data (or simply component).

As shown in FIG. 1, solid-lined squares and broken-lined squares with round corners represent subbands resulting from the analysis filtering operation. A number placed in each subband represents a segmentation level of thin subband. More specifically, the number represents how many times the analysis filtering operation has been performed on the image data as the baseband. The subbands labeled the letters "L" and "H" are respectively a low-frequency component and a high-frequency component. The label on the left-hand side represents analysis results of the horizontal analysis filtering operation and the label on the right-hand side represents analysis results of the vertical analysis filtering operation.

As shown in FIG. 1, a first analysis filtering operation is performed on the image data of the baseband, thereby resulting in four subbands (1LL, 1LH, 1HL, and 1HH) at a segmentation level of 1. A second analysis filtering operation is performed on the subband "1LL" having a low-frequency component in both the horizontal direction and the vertical direction. The second analysis filtering operation results in four subbands (2LL, 2LH, 2HL, and 2HH) at a segmentation level of 2. A third analysis filtering operation is performed on the subband "2LL" having a low-frequency component in both the horizontal direction and the vertical direction. The third analysis filtering operation results in four subbands (3LL, 3LH, 3HL, and 3HH) at a segmentation level of 3. A fourth analysis filtering operation is performed on the subband "3LL" having a low-frequency component in both the horizontal direction and the vertical direction. The fourth analysis filtering operation results in four subbands (4LL, 4LH, 4HL, and 4HH) at a segmentation level of 4.

Figure 2:
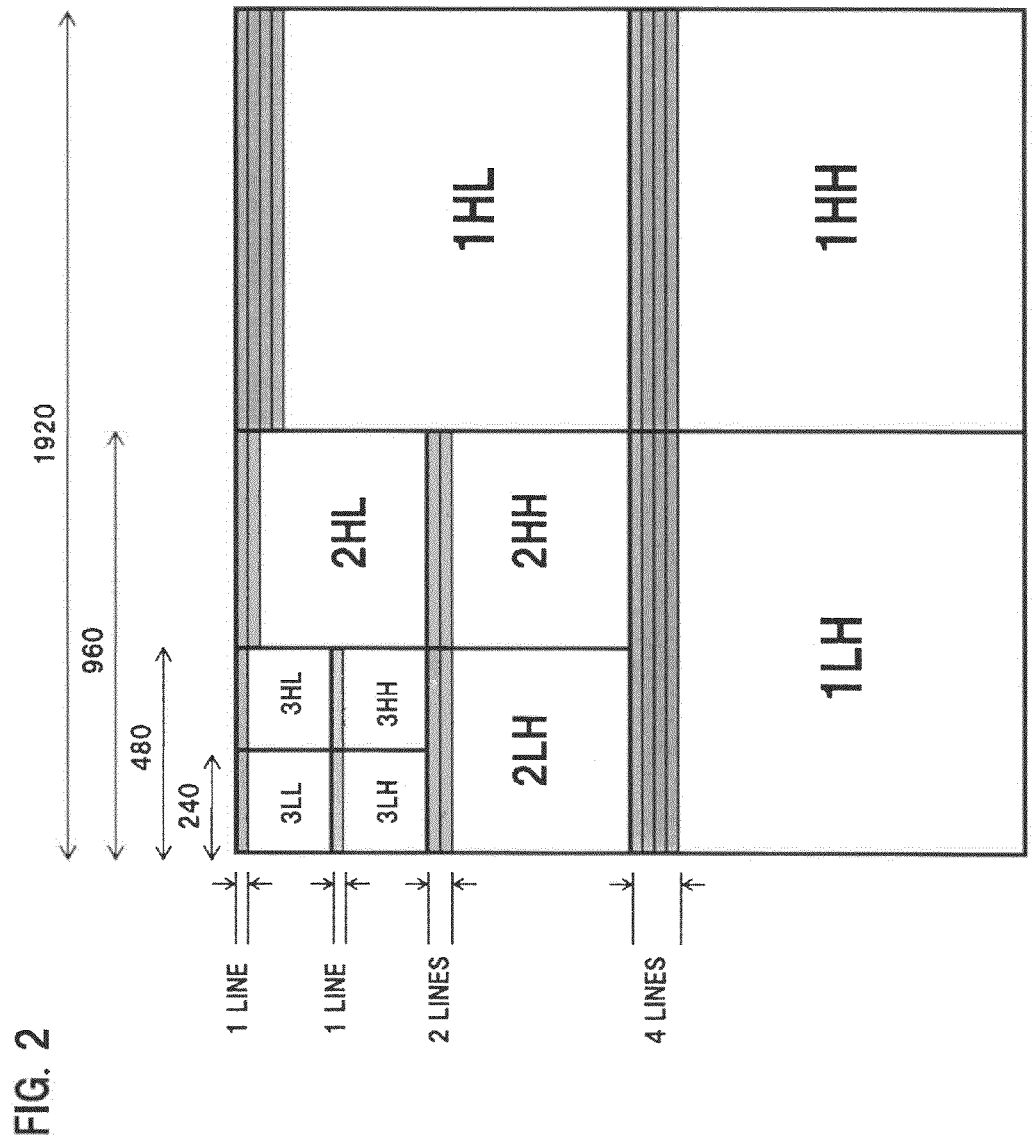
FIG. 2 diagrammatically illustrates the wavelet transform.

Transform and segmentation are performed on the low frequency component because energy of image concentrates on a low frequency component as shown in FIG. 2. The analysis filtering operation is recursively performed, generating the subbands in a layer structure. Data of a band having a low spatial frequency is narrowed into a small area so that efficient compression encoding is performed in an entropy encoding process.

In the discussion that follows, the analysis filtering operation is performed again on the subband "LL" having the low-frequency component in the horizontal and vertical directions from among the four subbands generated in the analysis filtering operation. The subband "LL" is referred to as a low-frequency subband and the remaining subbands free from subsequent analysis filtering operation, i.e., "LH," "HL," and "HH" are referred to as high-frequency subbands.

In one method, the wavelet transform may be performed on the entire picture. In a second method, one picture of image data may be divided by several lines and the wavelet transform may be in parallel performed on divided pictures. An amount of image data to be processed per wavelet transform process is smaller in the second method than in the first method. An output timing of the wavelet transform results can be started earlier in the second method. The delay time in the wavelet transform is thus reduced.

The number of lines per wavelet transform process (process unit) is based on the number of lines to obtain one line of coefficient data in the subband at the top level at a predetermined segmentation level in the wavelet transform.

An analysis filtering operation segments the image data into four, and the number of lines are halved as shown in FIG. 2. In the wavelet transform of a segmentation level of 2, eight lines of baseband image data are required to obtain one line of coefficient data at the top level subbands (3LL, 3LH, 3HL, and 3HH). The wavelet transform is thus performed with eight lines or more of the baseband image data as a process unit. With a segmentation level of 4 as shown in FIG. 1, sixteen lines of baseband image data are required.

A set of baseband image data required to generate one of coefficient data in the low-frequency subband "LL" at the top level, i.e., at the low-frequency component subband is referred to as a precinct (or linblock). The precinct also refers to a set of coefficient data of all subbands that are obtained by wavelet transforming the image data of one precinct. The set of coefficient data of all subbands that are obtained by wavelet transforming the image data of one precinct is substantially identical to the set of baseband image data required to generate one of coefficient data in the low-frequency subband "LL" at the top level.

The precincts in each picture are not necessarily equal to each other in the number of lines.

Synthesis filters for wavelet transform include a 5×3 filter and a 9×7 filter, adopted in JPEG 2000 standards. Typical computation method used in the analysis filtering operation of such a filter is convolution. The convolution computation is a basic digital filtering process. In the convolution computation, a tap coefficient of the filter is convolution multiplied by actual input data. A long tap length leads to an increase in calculation workload.

Wavelet transform lifting technique is disclosed as a method to cope with this problem in the paper entitled "The lifting scheme: A custom-design construction of biorthogonal wavelets," Appl. Comput. Harmon. Anal., Vol. 3, No. 2, pp. 186-200, 1996 authored by W. Swelden.

Figure 3:
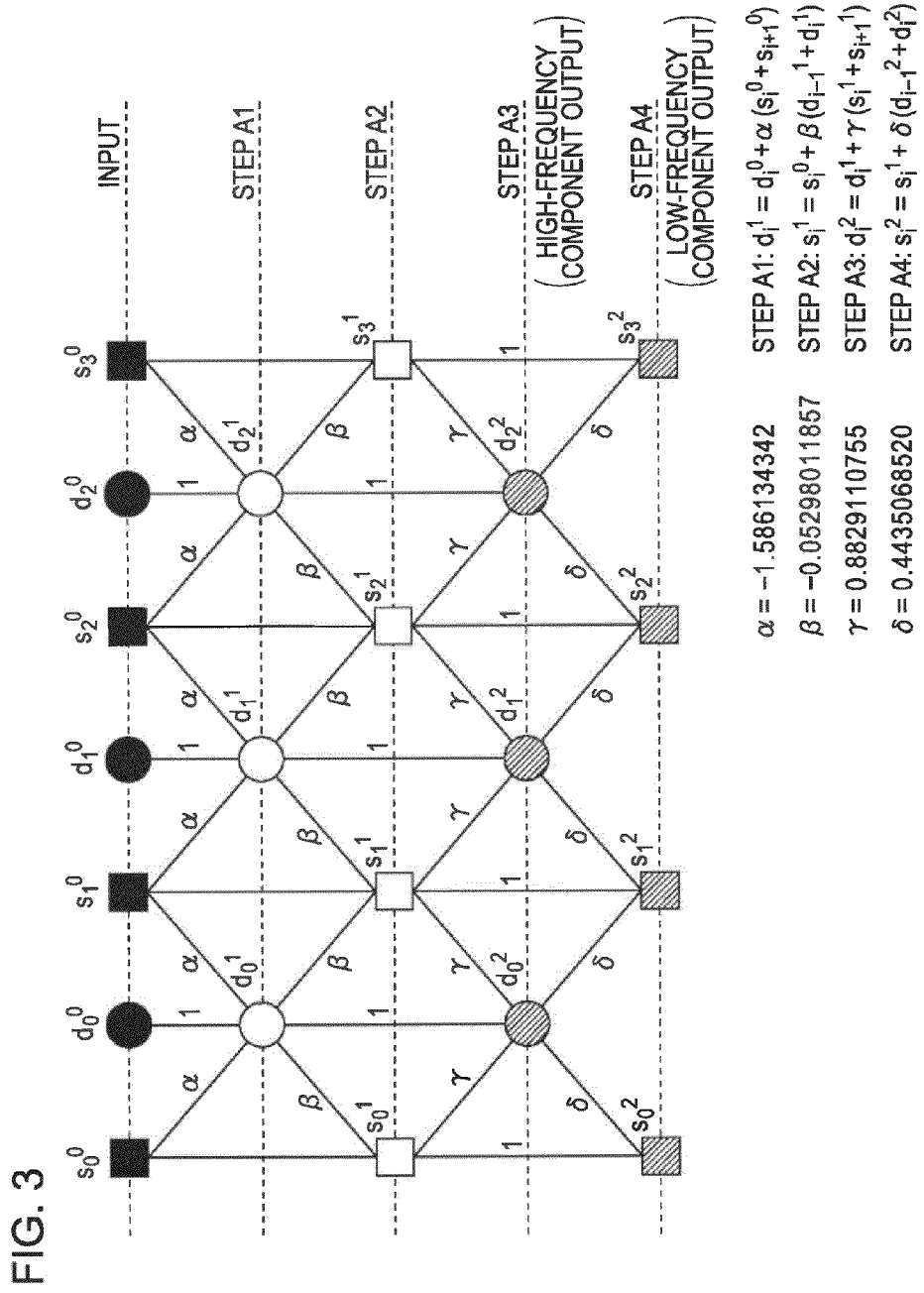
FIG. 3 diagrammatically illustrates a lifting structure of a 9×7 analysis filter.

FIG. 3 illustrates the lifting structure of the 9×7 filter. As shown in FIG. 3, a first row (top row) represents a sample group (pixel line) of an input image and second and third rows represent components (coefficients) generated in step A1 and step A2. A fourth row represents a high-frequency component generated in step A3 and a fifth row represents a low-frequency component generated in step A4. The top row may be not only the sample group of the input image but also coefficients obtained in a preceding analysis filtering operation. Solid squares denote even-numbered samples or lines and solid circles denote odd-numbered samples or lines.

The analysis filtering operation of applying the lifting technique to the 9×7 filter results in the high-frequency component in step A3 and the low-frequency component in step A4. The processes in steps A1-A4 are described by the following equations (1) through (4):

$$\text{Step } A1: d_i^1 = d_i^0 + \alpha(s_i^0 + s_{i+1}^0) \quad (1)$$

$$\text{Step } A2: s_i^1 = s_i^0 + \beta(d_{i-1}^1 + d_i^1) \quad (2)$$

$$\text{Step } A3: d_i^2 = d_i^1 + \gamma(s_i^1 + s_{i+1}^1) \quad (3)$$

$$\text{Step } A4: s_i^2 = s_i^1 + \delta(d_{i-1}^2 + d_i^2) \quad (4)$$

where $\alpha = -1.586134342$, $\beta = -0.05298011857$, $\gamma = 0.8829110755$, and $\delta = 0.4435068520$.

In the analysis filtering operation with the lifting technique applied, processes in steps A1 and A2 are performed. After the high-frequency component coefficient is generated in step A3, the low-frequency component coefficient is generated in step A4. As represented in equations (1)-(4), a filter bank used in the filtering process is implemented through only addition and shifting operation. The amount of computation is thus substantially reduced.

The coefficient data obtained through the wavelet transform is entropy encoded into encoded data. The entropy encoded data, when used, is then entropy decoded. The encoded data is thus restored into original baseband image data through an inverse wavelet transform corresponding to the above-described wavelet transform.

Figure 4:
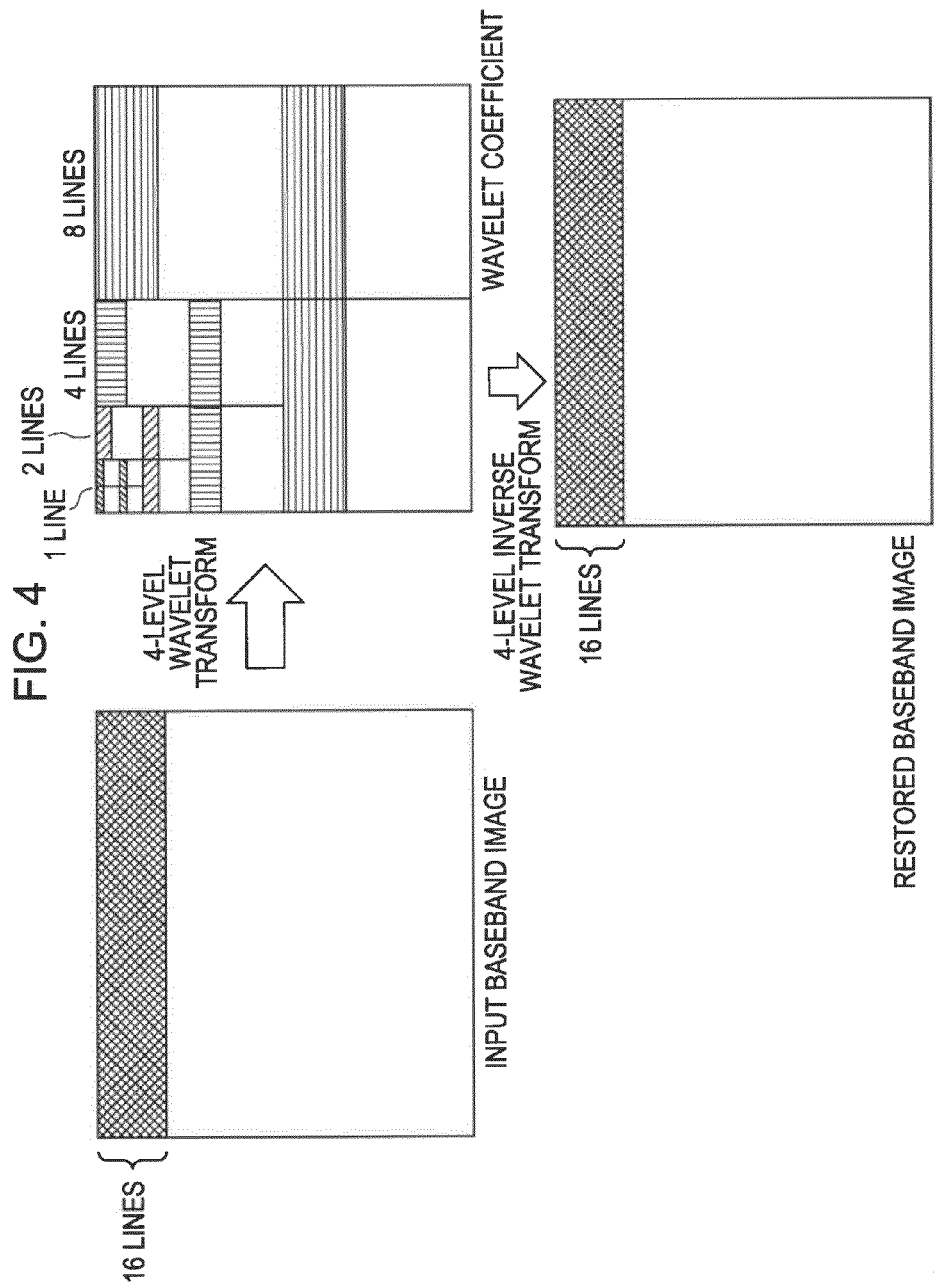
FIG. 4 illustrates a relationship between wavelet transform and inverse wavelet transform.

As shown in FIG. 4, the inverse wavelet transform is an operation inverse to the wavelet transform and inverse transforms the wavelet transformed coefficient data back into original baseband image data. If the wavelet transform is performed to a segmentation level of 4 as shown in FIG. 4, the inverse wavelet transform is also performed to a segmentation level of 4. The coefficient data that is obtained by wavelet transforming 16 lines of the baseband image data to a segmentation level of 4 is converted back (restored back) into 16 lines of original baseband image data through the inverse wavelet transform at a segmentation level of 4 as shown in FIG. 4.

A method of reducing a memory capacity required of a buffer in the inverse wavelet transform is described below.

Figure 5:
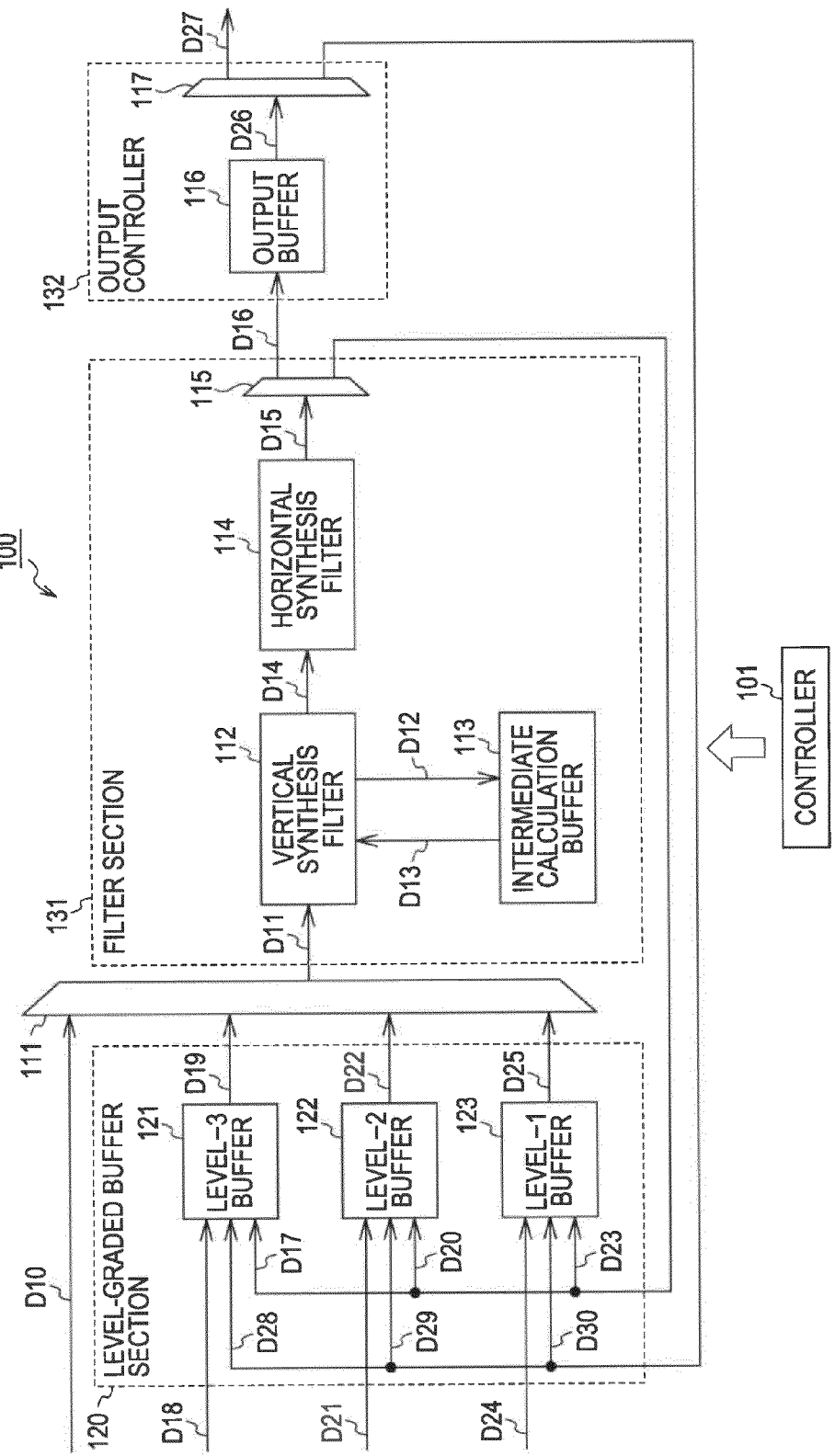
FIG. 5 is a block diagram illustrating an wavelet transforming apparatus in accordance with one embodiment of the present invention.

FIG. 5 is a block diagram illustrating an inverse wavelet transforming apparatus 100 of one embodiment of the present invention. The inverse wavelet transforming apparatus 100 receives the coefficient data wavelet transformed to a segmentation level of 4 and performs an synthesis filtering operation on the coefficient data. The inverse wavelet transforming apparatus 100 of FIG. 5 includes a controller 101, a selector 111, a vertical synthesis filter 112, an intermediate calculation buffer 113, a horizontal synthesis filter 114, a selector 115, an output buffer 116, a selector 117, and a level-graded buffer section 120.

The controller 101 controls the selector 111 through the level-graded buffer section 120. The selector 111 under the control of the controller 101 selects as an input to the vertical synthesis filter 112 one of an external signal (D10) and outputs (D19, D22, and D25) of level-graded buffers within the level-graded buffer section 120. The vertical synthesis filter 112 under the control of the controller 101 acquires, on a line-by-line basis, coefficient data of four subbands at a segmentation level of 4 from one of the external signal and the signals from the level-graded buffer section 120, selected by the selector 111 (D11).

The vertical synthesis filter 112 under the control of controller 101 uses coefficients for intermediate calculation read from the intermediate calculation buffer 113 in order to perform the synthesis filtering operation on the acquired coefficient data in terms of a frequency component of the baseband image data in a vertical direction.

As will be described in detail later, the vertical synthesis filter 112 writes onto the intermediate calculation buffer 113 a coefficient generated in the synthesis filtering operation (D12). The vertical synthesis filter 112 also reads from the intermediate calculation buffer 113 a coefficient required in the synthesis filtering operation (D13). The vertical synthesis filter 112 repeats the synthesis filtering operation in this way. Such a vertical synthesis filtering operation synthesizes a low-frequency component and a high-frequency component in a horizontal direction into two lines of low-frequency components in a horizontal direction and two lines of high-frequency components in a horizontal direction.

The synthesis filtering operation is thus completed on the input coefficient data. The vertical synthesis filter 112 reads as the synthesis filtering operation results the horizontal direction low-frequency and high-frequency components from the intermediate calculation buffer 113 in a predetermined order, for example, alternately on each line from left to right and then supplies the read coefficient data to the horizontal synthesis filter 114 (D14).

The horizontal synthesis filter 114 under the control of the controller 101 performs the synthesis filtering operation on the coefficient data supplied from the vertical synthesis filter 112 in terms of a frequency component of the baseband image data in an image horizontal direction.

The horizontal synthesis filtering operation thus generates two lines of coefficient data (or baseband image data) of low-frequency subbands in the vertical and horizontal directions at a one-notch lower segmentation level. The horizontal synthesis filter 114 outputs to the selector 115 the 2 lines of the coefficient data (or the baseband image data) in the low-frequency subband (D15).

Through one cycle of the vertical analysis filtering operation and the horizontal synthesis filtering operation, the vertical synthesis filter 112 and the horizontal synthesis filter 114 synthesize one line of coefficient data at the same position in the subbands at a target segmentation level, thereby generating two lines of coefficient data (or baseband image data) at the one-notch lower low-frequency subband.

Figure 6:
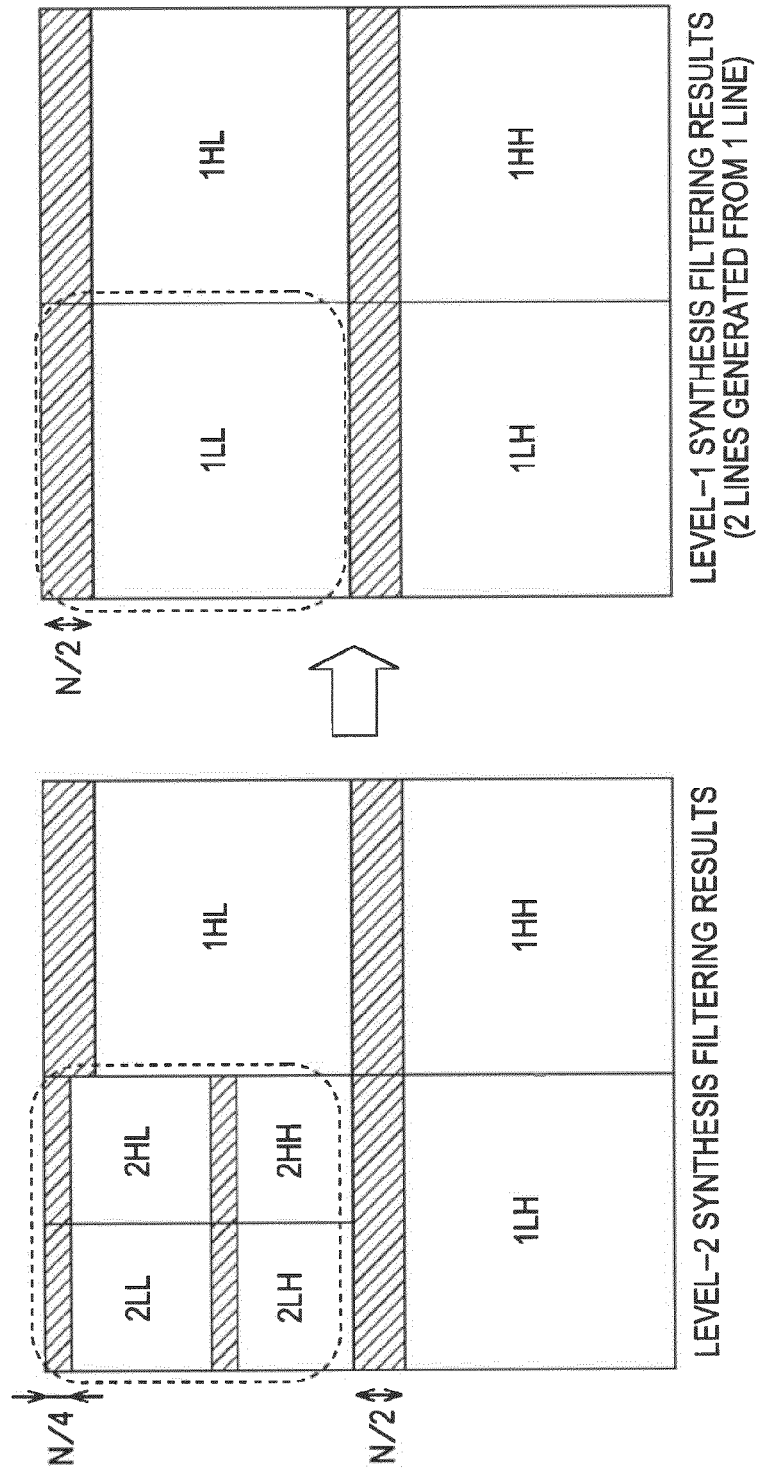
FIG. 6 diagrammatically illustrates synthesis filtering.

If one precinct is composed of N lines of image data as shown in FIG. 6, each of the vertical synthesis filter 112 and the horizontal synthesis filter 114 synthesizes N/4 lines of the coefficient data at four subbands at a segmentation level of 2, thereby generating N/2 lines of the coefficient data in the low-frequency subband at a segmentation level of 2.

By repeating the synthesis filtering operation with the segmentation level appropriately changed, the vertical synthesis filter 112 and horizontal synthesis filter 114 transform all the coefficient data wavelet transformed by precinct into baseband image data. The vertical synthesis filter 112 and horizontal synthesis filter 114 repeat the synthesis filtering operation on all precincts of all pictures. The synthesis filtering operation by precinct processes a smaller amount of data at a time than the synthesis filtering operation performed on an entire image. The inverse wavelet transforming apparatus 100 reduces a delay time in the inverse wavelet transform thereof. Since the synthesis filtering operation is performed on a line-by-line basis, fine control can be performed. The inverse wavelet transforming apparatus 100 optimizes the inverse wavelet transform more and reduces the delay time.

Returning to FIG. 5, the selector 115 under the control of the controller 101 selects a data output destination of the horizontal synthesis filter 114. The selector 115 thus supplies a part of the coefficient data generated in the synthesis filtering operation to the level-graded buffer section 120 for storage and the other part of the coefficient data to the output buffer 116 for storage. For example, the selector 115 supplies one of two lines of coefficient data in the low-frequency subband supplied from the horizontal synthesis filter 114 for storage (D16) and the other of the two lines to the level-graded buffer section 120 in order to store corresponding level-graded buffer of the coefficient data in the level-graded buffer section 120 (D17, D20, and D23).

If data supplied from the horizontal synthesis filter 114 is the baseband image data, the selector 115 supplies two lines of the image data to the output buffer 116 in order to store one line and output the other line to the outside.

The output buffer 116 under the control of the controller 101 stores one line of the coefficient data and the image data supplied from the selector 115, as necessary, and reads and supplies the data stored thereon as necessary to the selector 117. For example, if one line of the coefficient data in the subband is supplied by the selector 115, the output buffer 116 stores the coefficient data. If two lines of the baseband image data finally generated in the synthesis filtering operation is supplied by the selector 115, the output buffer 116 outputs one line to the outside (D26) while storing the other line until a next output timing. When the baseband image data is stored, the output buffer 116 reads and outputs the coefficient data stored on the internal memory thereof to the selector 117 while writing the baseband image data on the internal memory thereof.

The selector 117 under the control of the controller 101 controls data outputting of the output buffer 116. For example, upon receiving the coefficient data from the output buffer 116, the selector 117 supplies the coefficient data to the level-graded buffer section 120 (D28, D29, and D30) in order to store the coefficient data onto the level-graded buffers in the level-graded buffer section 120. For example, when the baseband image data is supplied by the output buffer 116, the selector 117 outputs the baseband image data to the outside (D27).

Until a next synthesis filtering operation is performed, the level-graded buffer section 120 under the control of the controller 101 stores, on the level-graded buffers of the coefficient data, the coefficient data supplied via the selector 115 and the selector 117 or the synthesis filterable coefficient data supplied from the outside. The level-graded buffer section 120 supplies the coefficient data thereof to the selector 111.

The level-graded buffer section 120 includes a level-3 buffer 121, a level-2 buffer 122, and a level-1 buffer 123.

The level-3 buffer 121 under the control of the controller 101 controls the supplying of the coefficient data at a segmentation level of 3 to the selector 111 (and the vertical synthesis filter 112 via the selector 111). The level-3 buffer 121 stores, on an internal memory thereof, the coefficient data (3LL) in the low-frequency subband at a segmentation level of 3 supplied via the selector 115 or the selector 117 (D17 and D28) or the coefficient data in the high-frequency subbands (3LH, 3HL, and 3HH) at a segmentation level of 3 supplied from the outside (D18). At a predetermined timing, the level-3 buffer 121 multiplexes the coefficient data of the subbands at a segmentation level of 3 stored on the internal memory thereof and supplies the multiplexed coefficient data to the vertical synthesis filter 112 via the selector 111.

The level-2 buffer 122, controlled by the controller 101, controls the supplying of the coefficient data at a segmentation level of 2 to the selector 111 (and to the vertical synthesis filter 112 via the selector 111). The level-2 buffer 122 stores, on an internal memory thereof, the coefficient data (2LL) in the low-frequency subband at a segmentation level of 2 supplied via the selector 115 or the selector 117 (D20 and D29) or the coefficient data in the high-frequency subbands (2LH, 2HL, and 2HH) at a segmentation level of 2 supplied from the outside (D21). At a predetermined timing, the level-2 buffer 122 multiplexes the coefficient data of the subbands at a segmentation level of 2 stored on the internal memory thereof and supplies the multiplexed coefficient data to the vertical synthesis filter 112 via the selector 111.

The level-1 buffer 123, controlled by the controller 101, controls the supplying of the coefficient data at a segmentation level of 1 to the selector 111 (and to the vertical synthesis filter 112 via the selector 111). The level-1 buffer 123 stores, on an internal memory thereof, the coefficient data (1LL) in the low-frequency subband at a segmentation level of 1 supplied via the selector 115 or the selector 117 (D23 and D30) or the coefficient data in the high-frequency subbands (1LH, 1HL, and 1HH) at a segmentation level of 1 supplied from the outside (D24). At a predetermined timing, the level-1 buffer 123 multiplexes the coefficient data of the subbands at a segmentation level of 1 stored on the internal memory thereof and supplies the multiplexed coefficient data to the vertical synthesis filter 112 via the selector 111.

The level-graded buffer section 120 of FIG. 5 is configured so that the inverse wavelet transforming apparatus 100 performs the inverse wavelet transform to a segmentation level of 4. The level-graded buffer section 120 stores the coefficient data at one segmentation level separately from the coefficient data at another segmentation level except at the top segmentation level when the inverse wavelet transforming apparatus 100 performs the inverse wavelet transform. More specifically, the level-graded buffer section 120 includes the level-3 buffer 121 through the level-1 buffer 123 specifically dedicated to the respective segmentation level other than the top segmentation level.

As shown in FIG. 5, the vertical synthesis filter 112, the intermediate calculation buffer 113, the horizontal synthesis filter 114, and the selector 115 form a processor for the synthesis filtering operation and are collectively referred to as a filter section 131. The output buffer 116 and the selector 117 form a processor for image data outputting and are also collectively referred to as an output controller 132.

The calculation method of the synthesis filtering operation performed by the vertical synthesis filter 112 and the horizontal synthesis filter 114 is described below. In a method similar to the one described with reference to FIG. 3, the filtering process is preferably efficiently performed. To this end, a lifting technique is also used in the inverse wavelet transform.

Figure 7:
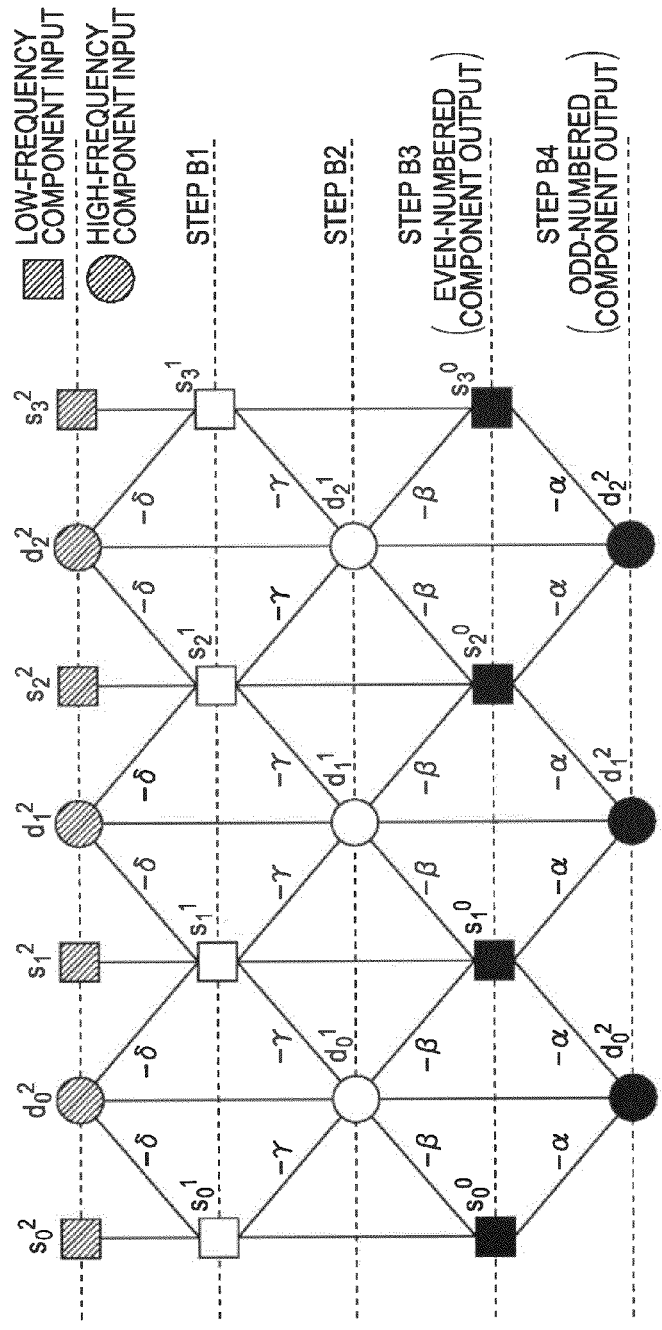
FIG. 7 illustrates a lifting structure of a 9×7 synthesis filter.

FIG. 7 illustrates the lifting structure of the 9×7 filter adopted in JPEG2000 standards. Unlike standard convolution computation, the synthesis filtering using the 9×7 filter lifting technique calculates an even-numbered component and an odd-numbered component through four steps of steps B1 through B4 below.

In a first (top) row of FIG. 7, hatched circles represent wavelet transformed coefficients of high-frequency component and hatched squares represent wavelet transformed coefficients of low-frequency component. Second and third rows represent components (coefficients) generated in steps B1 and B2. A fourth row represents even-numbered component outputs generated in step A3 and a fifth row represents odd-numbered component outputs generated in step A4.

The synthesis filtering operation of applying the lifting technique to the 9×7 filter results in an even-numbered component in step B3 and an odd-numbered component in step B4. The processes in steps B1-B4 are described by the following equations (5) through (8):

$$\text{Step } B1: s_i^1 = s_i^2 - \delta(d_{i-1}^2 + d_i^2) \quad (5)$$

$$\text{Step } B2: d_i^1 = d_i^2 - \gamma(s_i^1 + s_{i+1}^1) \quad (6)$$

$$\text{Step } B3: s_i^0 = s_i^1 - \beta(d_{i-1}^1 + d_i^1) \quad (7)$$

$$\text{Step } B4: d_i^0 = d_i^1 - \alpha(s_i^0 + s_{i+1}^0) \quad (8)$$

where $\alpha = -1.586134342$, $\beta = -0.05298011857$, $\gamma = 0.8829110755$, and $\delta = 0.4435068520$.

In the synthesis filtering operation with the lifting technique applied, processes in steps B1 and B2 are performed. After the even-numbered coefficient is generated in step B3, the odd-numbered coefficient is generated in step B4. As represented in equations (5)-(8), a filter bank used in the filtering process is implemented through only addition and shifting operation. The amount of computation is thus substantially reduced.

Figure 8:
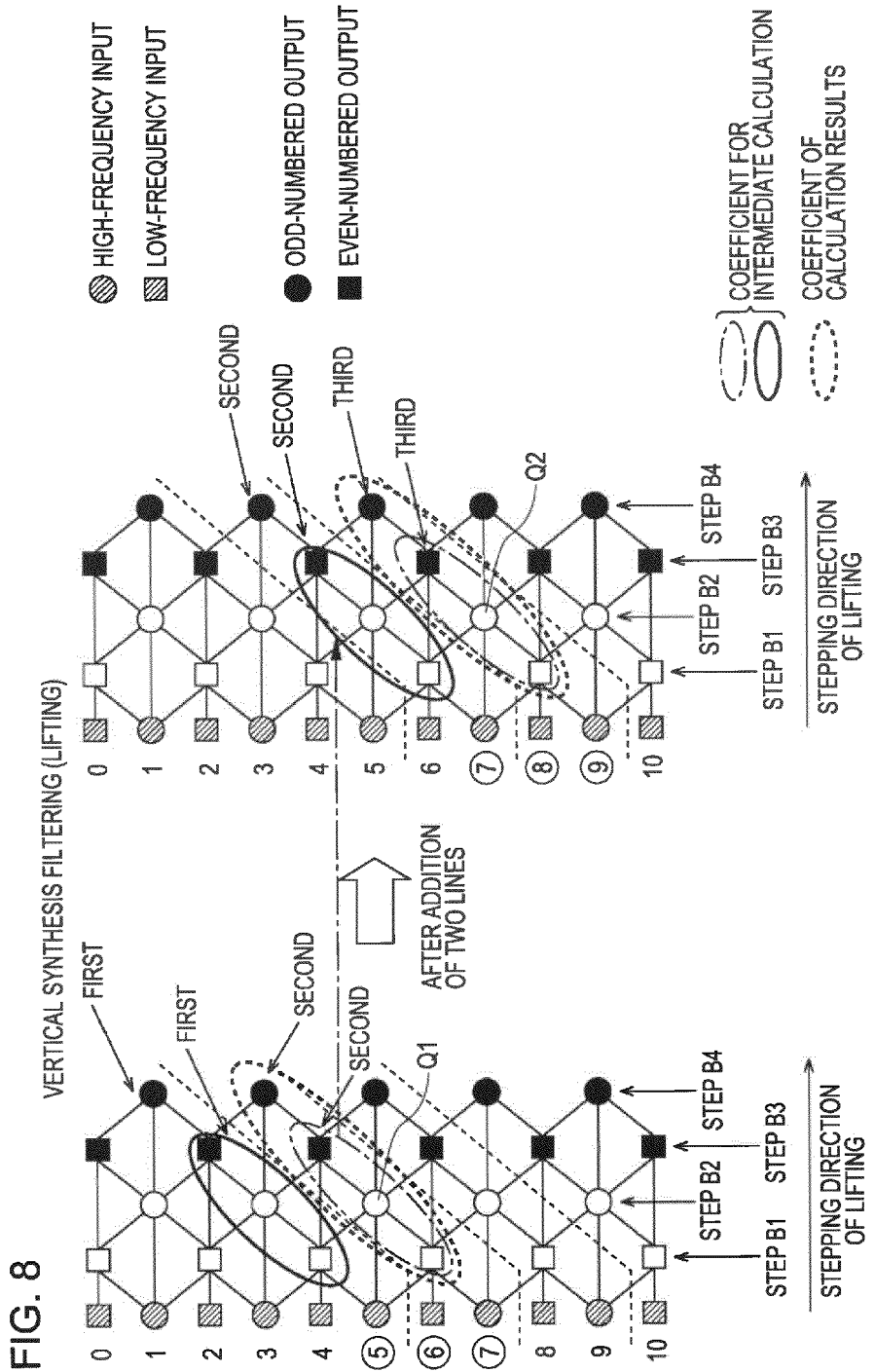
FIG. 8 illustrates a vertical synthesis filtering operation.

The vertical synthesis filtering operation performed by the vertical synthesis filter 112 is specifically described. FIG. 8 illustrates the vertical synthesis filtering operation performed on a group of coefficient data in a vertical direction in accordance with the lifting structure of FIG. 7.

As shown in FIG. 8, even-numbered coefficient data (also referred to as even-numbered coefficients) and odd-numbered coefficient data (also referred to as odd-numbered coefficient) are generated through the four steps of B1 through B4 discussed with reference to FIG. 7. The stepping direction of the lifting is rightward.

Numbers arranged in a vertical direction to the left of the respective coefficients indicate line numbers. Hatched circles and squares at a first column from the left represent high-frequency inputs and low-frequency inputs, respectively. Circles and squares on a second and subsequent columns represent high-frequency components and low-frequency components generated in the course of vertical lifting operations, respectively. From among the circles and squares on the second and subsequent columns, solid circles and squares represents odd-numbered coefficients at odd-numbered lines and even-numbered coefficients at even-numbered lines, respectively.

The left portion of FIG. 8 is described first. FIG. 8 illustrates in the left portion thereof the vertical lifting operation performed on coefficients input on three lines at line number 4 through 6, from among others, in a vertical direction. An even-numbered coefficient on the top row is not combined with odd-numbered coefficients and the discussion thereof is omitted here.

Coefficients at six lines of line number 0 through line number 5 are used to determine a first even-numbered coefficient in step B3 of the vertical lifting operation and a first odd-numbered coefficient in step B4 of the vertical lifting operation.

Three coefficients enclosed in a heavy-lined ellipse and coefficients at two lines of circled line numbers 6 and 7 are used to determine second even-numbered and odd-numbered coefficients. A coefficient at a circled line number 5 is also used to calculate a coefficient labeled Q1 in step B2.

The three coefficients enclosed in the heave-lined ellipse are parts of the coefficients generated in the course of the vertical lifting operation for the first even-numbered and odd-numbered coefficients (first vertical lifting operation).

The vertical lifting operation is thus performed on the three coefficients enclosed in the heavy-lined ellipse calculated in the first vertical lifting operation and the coefficients at the three lines of line numbers 5 through 7. The coefficient at line number 5 is the re-entered coefficient, and in practice, the coefficients at two lines (at line numbers 6 and 7) are thus additionally input. The coefficient data of three lines in a vertical direction (coefficient data at two lines in practice) is read from the corresponding buffers in the level-graded buffer section 120 of FIG. 5 on a level basis. More specifically, through the wavelet transform at the segmentation level of 2, the coefficient data is read from the level-2 buffer 122.

The three coefficients enclosed in the heavy-lined ellipse, generated in the course of the vertical lifting operation to determine the first even-numbered and odd-numbered coefficients, are used to determine second even-numbered and odd-numbered coefficients. These coefficients are stored onto the intermediate calculation buffer 113 after the second even-numbered and odd-numbered coefficients are determined and are thus read from the intermediate calculation buffer 113.

More specifically, the vertical lifting operation is performed on the three coefficients enclosed in the heave-lined ellipse stored on the intermediate calculation buffer 113 in the middle of the first vertical lifting operation and the coefficients at the three lines at line numbers 5 through 7 read from the corresponding level buffer. Four coefficients including the second even-numbered and odd-numbered coefficients (enclosed in a heavy-broken-lined ellipse) are obtained. As in the first vertical lifting operation, these coefficients are stored onto the intermediate calculation buffer 113. When these coefficients are written, coefficients for use in a next vertical lifting operation are read from the intermediate calculation buffer 113. As shown in FIG. 8, three coefficients enclosed in a dot-and-dash chain-lined ellipse, out of these four coefficients stored on the intermediate calculation buffer 113, are used to determines third even-numbered and odd-numbered coefficients and are thus read from the intermediate calculation buffer 113.

FIG. 8 illustrates in the right portion thereof the vertical lifting operation performed when coefficients at two lines are additionally read subsequent to reading of the coefficient at line number 7, i.e., when coefficients at three lines of line numbers 7 through 9 in the vertical direction are input.

Three coefficients enclosed in a heavy-lined ellipse and coefficients at two lines of circled line numbers 8 and 9 are used to determine third even-numbered and odd-numbered coefficients in a manner similar to the determination of the second even-numbered and odd-numbered coefficients. A coefficient at a circled line number 7 is also used to calculate a coefficient labeled Q2 in step B2.

The three coefficients enclosed in a heavy-lined ellipse on the right portion of FIG. 8, also enclosed in the heavy-broken-lined ellipse on the left side of FIG. 8, are stored on to the intermediate calculation buffer 113 in the second vertical lifting operation.

The vertical lifting operation is performed on the three coefficients enclosed in the heavy-lined ellipse and stored in the second vertical lifting operation and the coefficients at the three lines of line numbers 7 through 9 read and input from the corresponding level buffer. Four coefficients containing the third high-frequency and low-frequency coefficients (enclosed in a broken-heavy-lined ellipse) are obtained. These coefficients are stored onto the intermediate calculation buffer 113. When these coefficients are written, coefficients for use in a next vertical lifting operation are read from the intermediate calculation buffer 113. As shown in the right portion of FIG. 8, three coefficients enclosed in a dot-and-dash chain-lined ellipse, out of these four coefficients stored on the intermediate calculation buffer 113, are used to determines third even-numbered and odd-numbered coefficients and are thus read from the intermediate calculation buffer 113.

The vertical lifting operation is performed on the input coefficient data and the coefficients stored on the intermediate calculation buffer 113. The vertical lifting operation is performed to the bottom on the screen. The analysis filtering operation in the vertical direction is thus completed.

Figure 9:
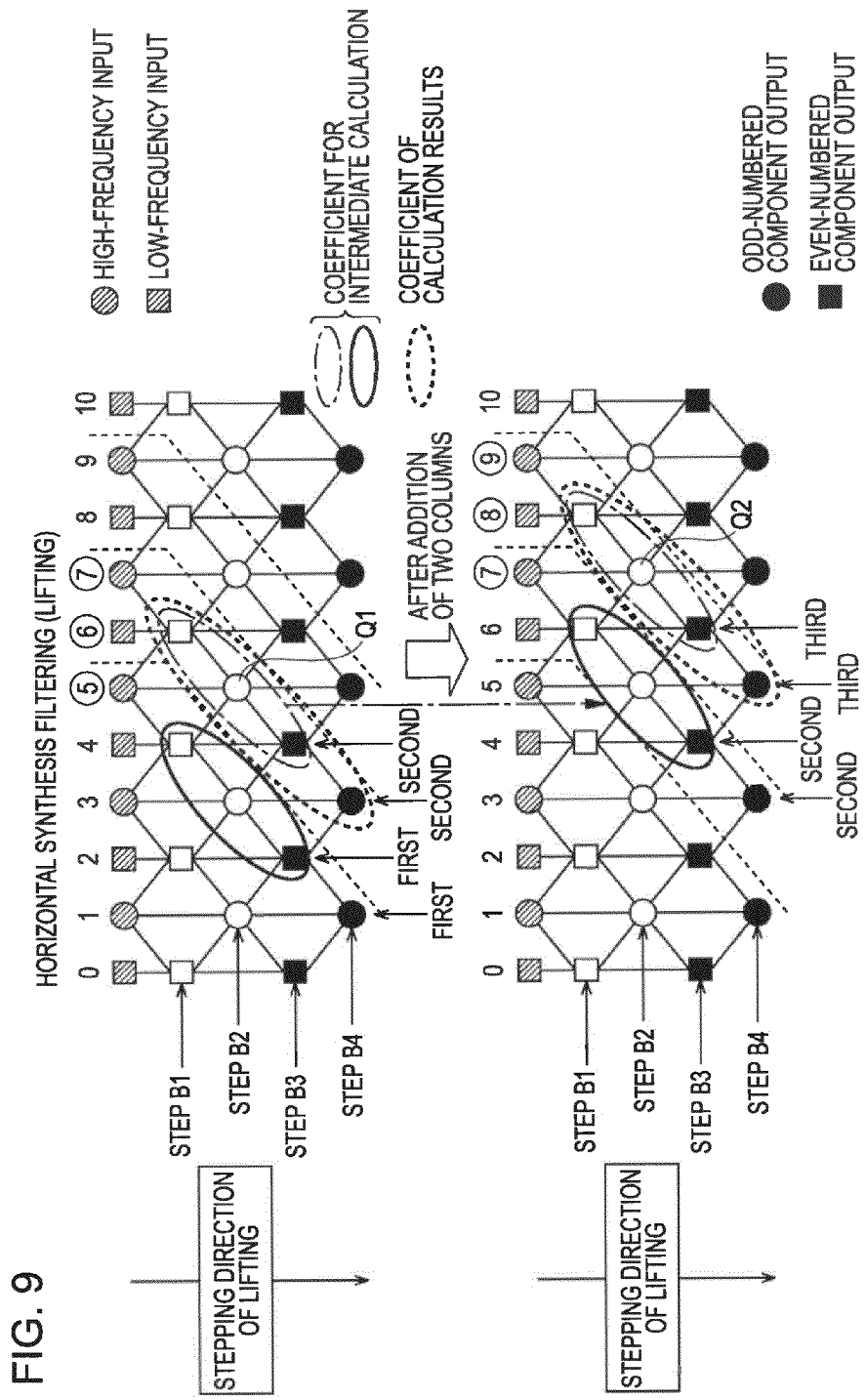
FIG. 9 illustrates a horizontal synthesis filtering operation.

The horizontal synthesis filtering operation performed by the horizontal synthesis filter 114 is specifically discussed below. FIG. 9 illustrates the horizontal analysis filtering operation that is applied to the coefficient group in the horizontal direction using the lifting structure of FIG. 7.

As shown in FIG. 9, the input horizontal coefficients have undergone the processes in the four steps (steps B1-B4) described with reference to FIG. 7. The even-numbered and odd-numbered coefficients are thus generated. The direction of step of the lifting process is downward from top to bottom.

Numbers horizontally placed above the coefficients represent respective column numbers. Hatched circles and squares at the first row represent input high-frequency coefficients and low-frequency coefficients, respectively. Circles and squares at the second and lower rows represent high-frequency coefficients and low-frequency coefficients, respectively, generated in lifting operation. Solid circles and squares represent odd-numbered coefficients and even-numbered coefficients, respectively, as lifting results.

The lifting operation is described from top to bottom rows. At the top row of FIG. 9, three coefficients at column numbers 5 through 7 are input. A horizontal lifting operation is now performed. The leftmost even-numbered coefficient is not combined with odd-numbered coefficients and the discussion thereof is omitted here.

Coefficients at column numbers 0 through 5 are used to determine a first even-numbered coefficient in step B3 of the horizontal lifting operation and a first odd-numbered coefficient in step B4 of the horizontal lifting operation.

Three coefficients enclosed in a heavy-lined ellipse and coefficients at two columns, namely, circled column numbers 6 and 7 are used to determine second even-numbered and odd-numbered coefficients. To calculate a coefficient labeled Q1 in step B2, a coefficient at circled column number 5 is used.

The three coefficients enclosed in the heavy-lined ellipse are parts of the coefficients generated in the course of the horizontal lifting operation to determine the first odd-numbered and even-numbered coefficients (hereinafter referred to as a first horizontal lifting operation).

The coefficients at three columns of circled column numbers 5 through 7 are input to determine second odd-numbered and even-numbered coefficients and further three coefficients enclosed in a heavy-lined ellipse generated in the first horizontal lifting operation are latched. The coefficients that need to be latched are only three and may be thus stored in a flipflop typically used as a latch in the horizontal synthesis filter 114.

The horizontal lifting operation is performed on the three coefficients enclosed in the heavy-lined ellipse generated in the first horizontal lifting operation and the coefficients at three columns, namely, at column numbers 5 through 7. In the course of and at the end of the horizontal lifting operation, four coefficients including the second odd-numbered and even-numbered coefficients are generated (as represented by a broken-heavy-lined ellipse). Three coefficients enclosed in a dot-and-dash chained ellipse, out of the four coefficients, are used to determine third odd-numbered and even-numbered coefficients and are latched in the internal flip-flop.

FIG. 9 illustrates in the lower portion thereof a horizontal lifting operation that is performed when coefficients at two columns in a horizontal direction are additionally input subsequent to inputting of the coefficient at column number 7. More specifically, the horizontal lifting operation is performed with three coefficients at column numbers 7 through 9 in a horizontal direction input.

Three coefficients enclosed in a heave-lined ellipse and coefficients at two columns of circled column numbers 8 and 9 are used to determine third odd-numbered and even-numbered coefficients in a similar manner as in the determination of the second even-numbered and odd-numbered coefficients. A coefficient at a circled column number 7 is also used to determine a coefficient labeled Q2 in step B2.

The three coefficients enclosed in the heavy-lined ellipse in the lower portion of FIG. 9, also enclosed in a dot-and-dash chained ellipse, are latched in the second horizontal lifting operation.

The horizontal lifting operation is performed on the three coefficients enclosed in the heavy-lined ellipse latched in the second horizontal lifting operation and the input coefficients at the three columns of column numbers 7 through 9. This horizontal lifting operation results in four coefficients including third odd-numbered and even-numbered coefficients (as enclosed in a broken-heavy-lined ellipse). Three coefficients enclosed in the dot-and-dash chained ellipse, out of the four coefficients, are used to determine the third odd-numbered and even-numbered coefficients and are thus latched in the internal flip-flop.

The coefficients at the three columns are input while the three coefficients in intermediate calculation are stored. The horizontal lifting operation is performed to the rightmost column on the screen. The analysis filtering operation in the horizontal direction is thus completed.

Any type of memory may be used for the intermediate calculation buffer 113. Part of the coefficients stored on the intermediate calculation buffer 113 may be read to be used in a subsequent lifting operation. In other words, read and write operations of the coefficients to the intermediate calculation buffer 113 are frequently performed.

Figure 10:
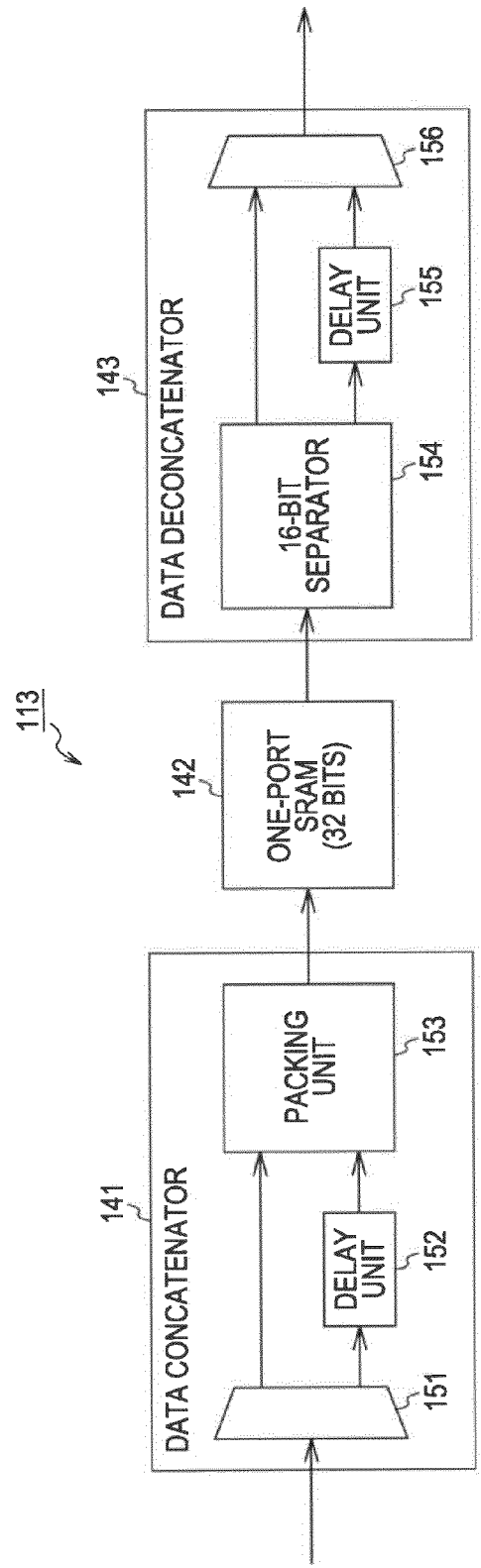
FIG. 10 is a block diagram illustrating an intermediate calculation buffer of FIG. 5.

A coefficient read operation and a coefficient write operation are preferably performed to the intermediate calculation buffer 113 in parallel in order to shorten delay time involved in the read and write operations. FIG. 10 is a block diagram of the intermediate calculation buffer 113.

As shown in FIG. 10, the intermediate calculation buffer 113 includes a data concatenator 141, a one-port static random-access memory (SRAM) 142, and a data deconcatenator 143.

The data concatenator 141 concatenates two data units of 16 bits consecutively supplied from the vertical synthesis filter 112 into 32-bit data and supplies the 32-bit data to the one-port SRAM 142. The data concatenator 141 includes a selector 151, a delay unit 152, and a packing unit 153.

The selector 151 handles two consecutively supplied data units of 16 bits as a set, and supplies a first data unit to the delay unit 152 and a second data unit to the packing unit 153. The delay unit 152 delays the supplied data unit of 16 bits by one cycle (until a next data supplying timing) and supplies the delayed data unit of 16 bits to the packing unit 153. More specifically, the packing unit 153 is concurrently supplied with two data units of 16 bits. The packing unit 153 concatenates the two 16-bit data units into one 32-bit data unit and then supplies the 32-bit data unit to the one-port SRAM 142.

The data deconcatenator 143 reads the 32-bit data unit from the one-port SRAM 142 and deconcatenates the one 32-bit data unit into two 16-bit data units and outputs the two 16-bit data units. The data deconcatenator 143 includes a 16-bit separator 154, a delay unit 155, and a selector 156.

The 16-bit separator 154 separates the 32-bit data unit read from the one-port SRAM 142 into upper 16 bits and lower 16 bits, thereby generating two 16-bit data units. The 16-bit data unit is supplied to the selector 156 and the lower 16-bit data unit is supplied to the delay unit 155. The delay unit 155 delays the lower 16-bit data unit, supplied from the 16-bit separator 154, by one cycle and then supplies the delayed 16-bit data unit to the selector 156. The selector 156 alternately selects between the input from the 16-bit separator 154 and the input from the delay unit 155 every cycle. In this way, the two 16-bit data units are successively output.

The one-port SRAM 142 is a recording medium that performs data write and read operations using a single port system. The one-port SRAM 142, controlled by the controller 101, stores the 32-bit data unit supplied from the packing unit 153 in the data concatenator 141 and outputs the stored 32-bit data unit stored thereon to the 16-bit separator 154 in the data deconcatenator 143.

From among memories for use in data storage, a random-access memory (RAM) electronically performs data write and read operations and works at high speed but is costly. The use of many RAMs is prohibitively costly. One type of SRAMs employs a flipflop circuit. SRAM requires no particular operation for storage and has a high-speed feature. On the other hand, SRAM due to the complex circuit arrangement thereof suffers from a low degree of integration. To achieve a high degree of integration, a memory capacity of the SRAM is to be reduced.

The SRAMs include two types, namely, a one-port SRAM that cannot perform concurrently data input and output operations and a two-port SRAM that can perform concurrently data input and output operations. FIGS. 11A and 11B respectively illustrate input and output terminals of the one-port SRAM and the two-port SRAM.

As shown in FIG. 11A, the one-port SRAM includes typically a terminal receiving a clock signal "CLK," a terminal receiving a chip-enable signal "CEN," a terminal receiving an enable signal "EN" controlling the data input and output operations, a terminal receiving address information "ADR" specifying an address where the 32-bit data is written or an address where the 32-bit data is read, a terminal receiving the 32-bit write data "WD", and a terminal outputting the read 32-bit data "RD."

As shown in FIG. 11B, the two-port SRAM includes typically a terminal receiving a write clock signal "WCK," a terminal receiving a write control enable signal "WEN," a terminal receiving write address information "WADR" specifying a write address for the 32-bit data, a terminal receiving 32-bit write data "WD," a terminal receiving a read clock signal "RCLK," a terminal receiving a read control enable signal "REN," a terminal receiving read address information "RADR," specifying a read address for the 32-bit data, and a terminal outputting read 32-bit data "RD."

In the one-port SRAM of FIG. 11A, the chip-enable signal "CEN" switches between the read operation and the write operation, and the enable signal "EN" and the address information "ADR" are commonly used in the read and write operations. If the chip-enable signal "CEN" specifies the read operation, the enable signal "EN" controls an operation timing for the read operation and the address information "ADR" specifies an address at which data is to be read. If the chip-enable signal "CEN" specifies the write operation, the enable signal "EN" controls an operation timing for the write operation and the address information "ADR" specifies an address at which data is to be written. In conclusion, the one-port SRAM cannot perform concurrently both the read operation and the write operation.

In the two-port SRAM of FIG. 11B, the signal controlling the write operation and the signal controlling the read operation are independent of each other. The two-port SRAM can perform each of the read operation and the write operation at any timing, and perform the two operations in parallel.

Figure 12A:
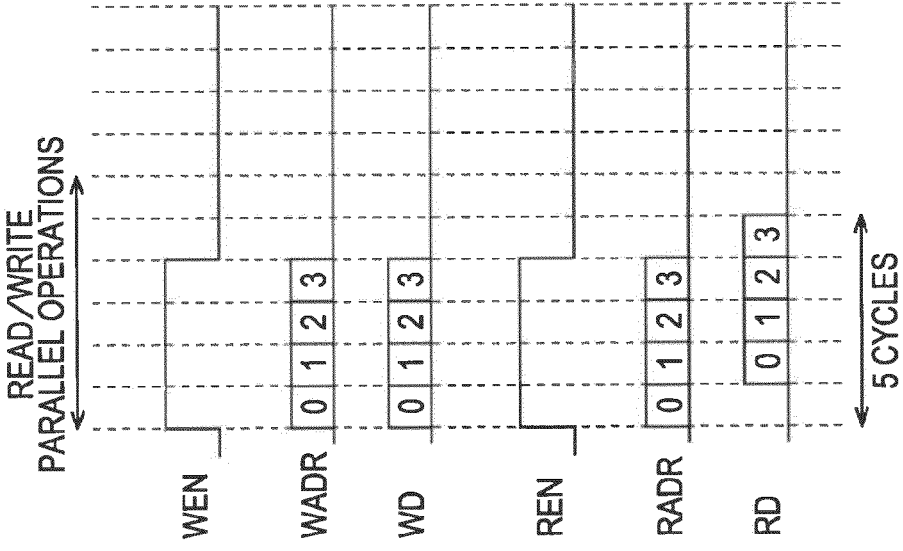
FIGS. 12A and 12B are timing diagrams of timings of data input to and output from each of the typical one-port SRAM and two-port SRAM.
Figure 12B:
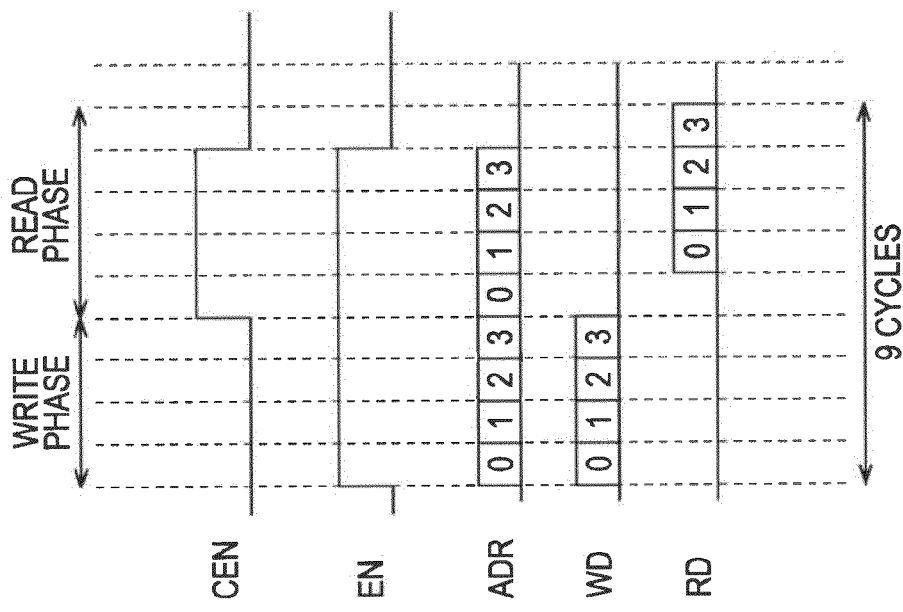

FIGS. 12A and 12B illustrate timing diagrams of the one-port SRAM and the two-port SRAM, each writing and reading four data units. FIG. 12A is the timing diagram of the one-port SRAM. FIG. 12B is the timing diagram of the two-port SRAM.

In the one-port SRAM of FIG. 12A, the four data units are consecutively written (in 4 cycles) in accordance with the enable signal "EN" and the written four data units are consecutively read (in 4 cycles) after 1 cycle due to latency of the SRAM. The one-port SRAM takes time for the 9 cycles for the write and read operations of the four data units. The word "cycle" refers to process synchronization timing, namely, a unit of time division. For example, the cycle refers to a period of data write or data read operation.

As shown in FIG. 12B, the two-port SRAM receive both the write control enable signal "WEN" and the read control enable signal "REN," and the read and write operations of the four data units can be performed in parallel. As shown in FIG. 12B, the two-port SRAM can perform the read and write operations in 4 cycles, and thus complete the write and read operations in 5 cycles including 1 cycle for latency.

A high-definition television (HDTV) has a horizontal size of 1920 pixels in one line. If coefficients of one line are written to and read from the one-port SRAM, the one-port SRAM takes 3840 cycles (=1920×2). If the one-port SRAM is used for the intermediate calculation buffer 113 in the synthesis filtering operation, delay time substantially increases.

To decrease the cycle count, the two-port SPAM may be substituted for the one-port SRAM. However, the two-port SRAM is substantially identical to two one-port SRAMs configured in one structure. The two-port SRAM requires high manufacturing costs and the circuit area thereof is approximately twice as large as the one-port SRAM. Generally, a memory portion in each large-scale integration (LSI) chip occupies a major portion of the chip, and an increase in the memory portion directly leads to an increase in the chip overall area.

The one-port SRAM is thus used for the intermediate calculation buffer 113. The data concatenator 141 of FIG. 10 concatenates data units to be written onto the one-port SRAM 142 into a 32-bit data unit. Data is then read by 32 bit unit from the one-port SRAM 142. The data deconcatenator 143 deconcatenates the 32-bit data unit into two 16-bit data units. In this way, the data write and read operations of the one-port SRAM 142 are performed in parallel.

The operation of the intermediate calculation buffer 113 of FIG. 10 is described below with reference to a flowchart of FIG. 13.

Figure 13:
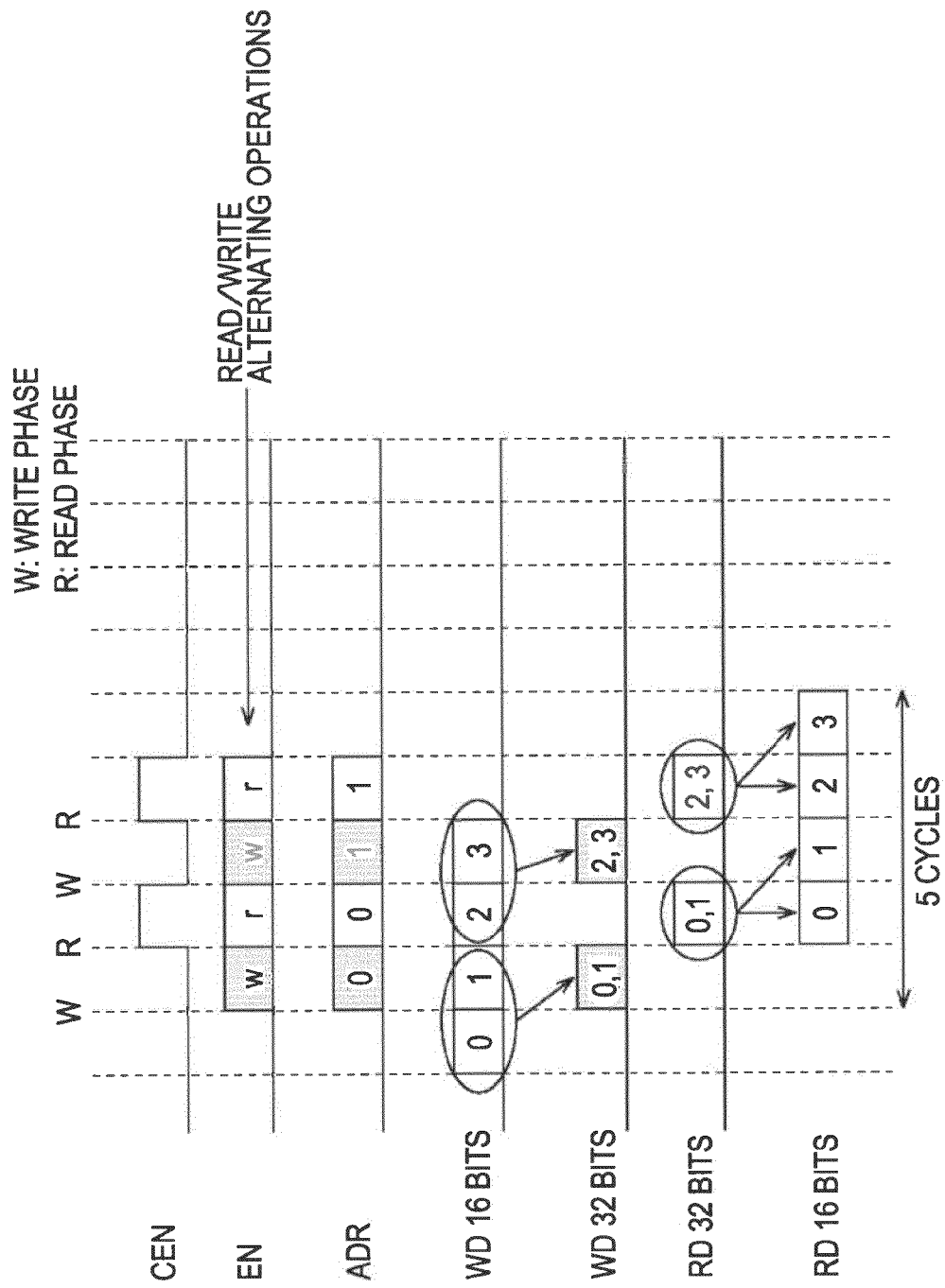
FIG. 13 is a timing diagram of the one-port SRAM of FIG. 10.

When "0" of a 16-bit write data (WD 16 bits) shown at a fourth from the top in FIG. 13 is supplied in a first cycle, the selector 151 in the data concatenator 141 delays the data "0" by 1 cycle using the delay unit 152 and then supplies the delayed data to the packing unit 153. When write data "1" of the 16-bit write data is supplied in a second cycle, the selector 151 in the data concatenator 141 supplies the data "1", to the packing unit 153. The packing unit 153 concatenates the data "0" and the data "1" in the second cycle, thereby generating 32-bit write data (WD 32 bits) "0 and 1". In accordance with write instructions shown at the first through third lines from the top in FIG. 13, the data "0 and 1" is written at an address "0."

When the 16-bit write data (WD 16 bits) "2" shown at the fourth line from the top in FIG. 13 is supplied in a third cycle, the selector 151 in the data concatenator 141 delays the data "2" by 1 cycle using the delay unit 152 and then supplies the delayed data to the packing unit 153. In the third cycle, no write operation is performed to the one-port SRAM 142.

In response to read instructions illustrated at the first through third lines in FIG. 13, the 16-bit separator 154 in the data deconcatenator 143 reads the 32-bit data written at the address "0" in the third cycle. The 16-bit separator 154 in the data deconcatenator 143 then deconcatenates the read data (RD 32 bit) "0 and 1" into two 16-bit data units (data "0" and data "1"). The 16-bit separator 154 supplies the deconcatenated data unit "0" to the selector 156 while supplying the other data unit "1" to the selector 156 with 1 cycle delayed by the delay unit 155. The selector 156 successively outputs the data "0" and the data "1" (RD 16 bits).

The data "2" supplied to the packing unit 153 with the delay involved in the third cycle is concatenated with 16-bit write data "3" supplied to the packing unit 153 by the selector 151 in the data concatenator 141 without being delayed through the delay unit 152. The packing unit 153 thus generates 32-bit write data (WD 32 bits) "2 and 3". In accordance with write instructions at the first through third lines from the top in FIG. 13, the packing unit 153 writes the data "2 and 3" onto an address "1."

In the same manner as in the third cycle, the 16-bit separator 154 in the data deconcatenator 143 reads the 32-bit data at the address "1" in a fifth cycle in response to the read instructions at the first through third lines in FIG. 13. The 16-bit separator 154 deconcatenates the read data (RD 32 bits) "2 and 3" into two 16-bit data units (data "2" and data "3"). The 16-bit separator 154 supplies the deconcatenated data "2" to the selector 156 while the other deconcatenated data "3" to the selector 156 via the delay unit 155 with a delay of 1 cycle introduced. The selector 156 successively outputs the data "2" and the data "3" (RD 16 bits).

The write operation and the read operation are performed to the one-port SRAM with two 16-bit data units handled as one 32-bit data unit. In the intermediate calculation buffer 113, the write operation of the data concatenator 141 and the read operation of the data deconcatenator 143 are performed concurrently in parallel in time division. In the 5 cycles, four data units are written and read from the one-port SRAM 142. The term "concurrently in parallel" means that the period from the start to the end of the write operation overlaps the period from the start to the end of the read operation. Strictly speaking, the read operation and the write operation are performed neither concurrently nor in parallel. The read operation and the write operation are alternately performed in a time-division manner.

The inverse wavelet transforming apparatus 100 controls an increase in circuit scale of the intermediate calculation buffer 113 and allows the intermediate calculation buffer 113 to operates at a high speed. The inverse wavelet transforming apparatus 100 thus restricts an increase in the delay time involved in the inverse wavelet transform.

In the above discussion, the one-port SRAM 142 inputs and outputs data by 32 bits. Any unit of data may be used in data inputting and outputting to the one-port SRAM 142. The intermediate calculation buffer 113 inputs and outputs data by 16 bits. Any unit of data may be used in data inputting and outputting to the intermediate calculation buffer 113. The structures of the data concatenator 141 and the data deconcatenator 143 are illustrated in FIG. 10 for exemplary purposes only. In practice, the structures of the data concatenator 141 and the data deconcatenator 143 are determined by the data unit in data inputting and outputting to the one-port SRAM 142 and the data unit in data inputting and outputting to the intermediate calculation buffer 113.

The basic structures of the data concatenator 141 and the data deconcatenator 143 remain the same as the one illustrated in FIG. 10. More specifically, the data concatenator 141 concatenates a plurality of data units input to the intermediate calculation buffer 113, thereby generating data of at least one input data unit to the one-port SRAM 142, and supplies the generated data to the one-port SRAM 142 for storage. The data deconcatenator 143 reads data of output data unit from the one-port SRAM 142, deconcatenates the read data into a plurality of data units of the intermediate calculation buffer 113, and outputs the data units. The one-port SRAM 142 thus alternately performs the read operation and the write operation by data input and output unit.

The output buffer 116 of FIG. 5 also includes a one-port SRAM. The controller 101 causes the output buffer 116 to store baseband image data output from the horizontal synthesis filter 114 and supplies the coefficient data stored on the output buffer 116 to the level-graded buffer section 120.

Figure 14:
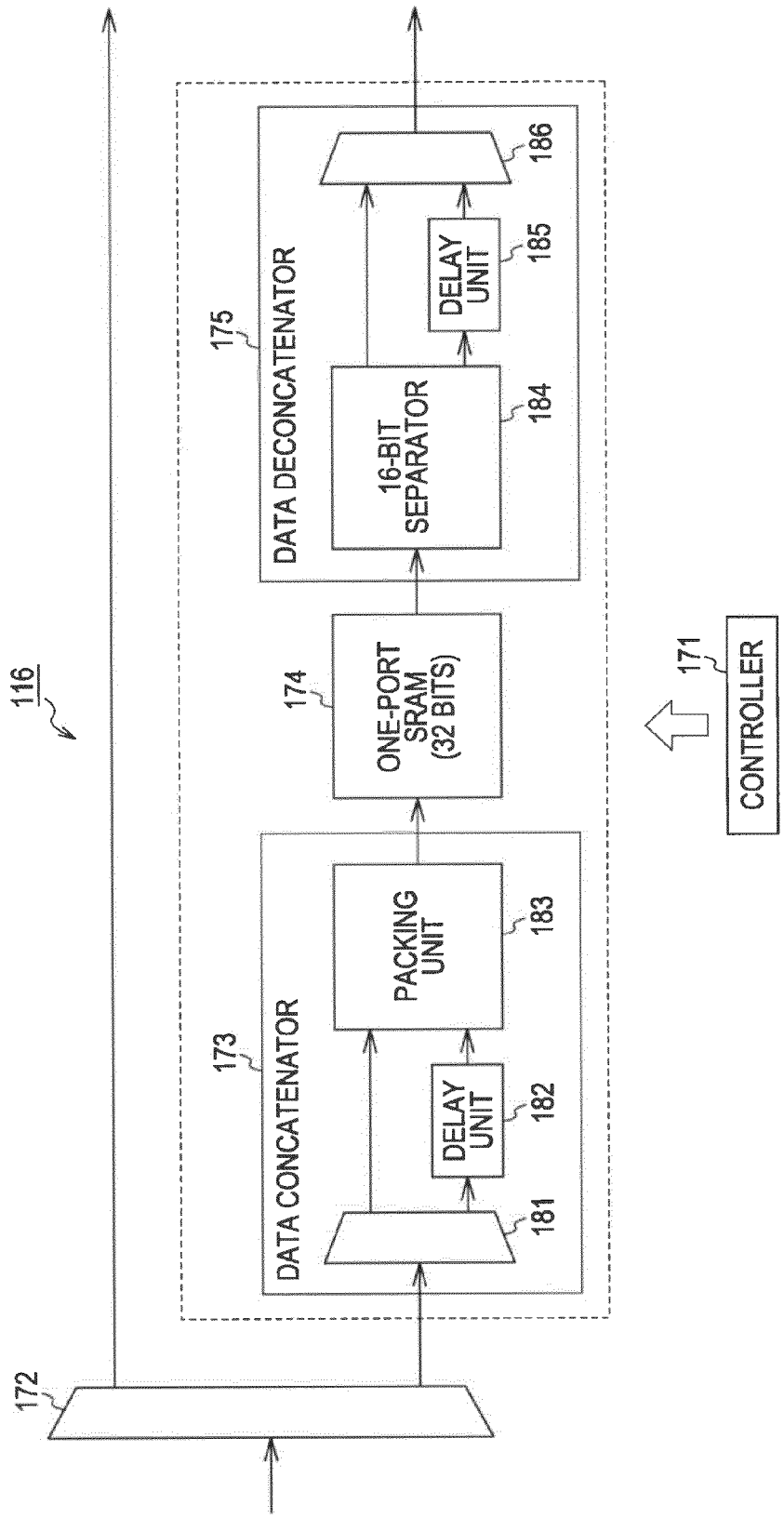
FIG. 14 is a block diagram illustrating in detail an output buffer of FIG. 5.

FIG. 14 is a block diagram illustrating an internal structure of the output buffer 116 of FIG. 5. As shown in FIG. 14, the output buffer 116 includes a controller 171, a selector 172, a data concatenator 173, a one-port SRAM 174, and a data deconcatenator 175.

The controller 171 controls the selector 172 through the data deconcatenator 175. The selector 172, controlled by the controller 171, determines a supply destination of data supplied from the horizontal synthesis filter 114 (FIG. 5). For example, the selector 172 supplies to the data concatenator 173 the coefficient data in the subband supplied from the horizontal synthesis filter 114. The selector 172 supplies one of two lines of the baseband image data supplied from the horizontal synthesis filter 114 to the selector 117 (FIG. 5) while supplying the other line of the two lines to the data concatenator 173.

The data concatenator 173, corresponding to the data concatenator 141 of FIG. 10, is identical in structure and operation to the data concatenator 141. The data deconcatenator 175, corresponding to the data deconcatenator 143 of FIG. 10, is identical in structure and operation to the data deconcatenator 143.

Figure 15:
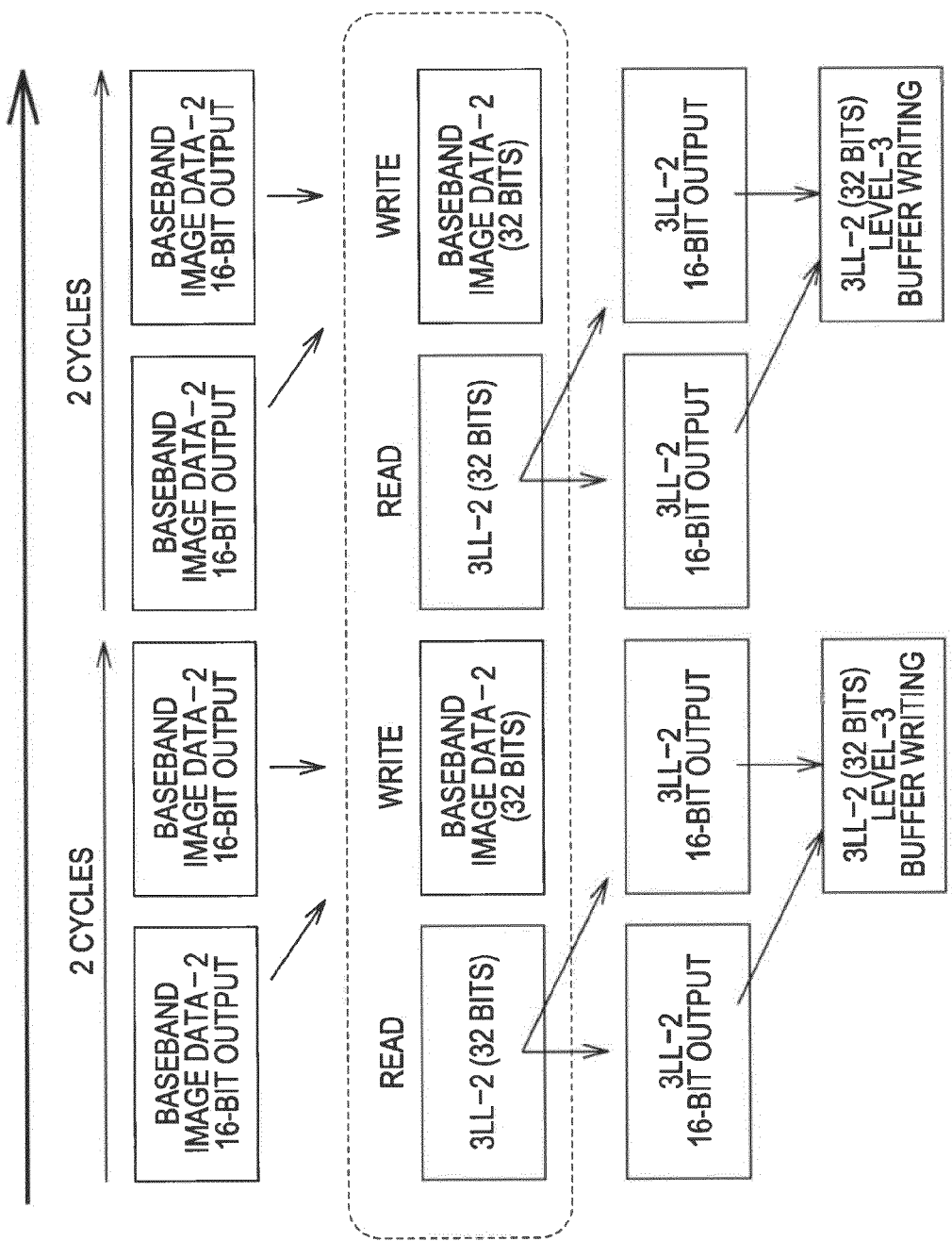
FIG. 15 illustrates timings of data input to and output from the output buffer of FIG. 5.

The data concatenator 173 includes a selector 181 identical in structure and operation to the selector 151, a delay unit 182 identical in structure and operation to the delay unit 152, and a packing unit 183 identical in structure and operation to the packing unit 153. As shown in FIG. 15, the data concatenator 173 concatenates two 16-bit data units supplied from the selector 172 for 2 cycles into a 32-bit data unit, and supplies the 32-bit data unit to the one-port SPAM 174 in 1 cycle.

The data deconcatenator 175 includes a 16-bit separator 184 identical in structure and operation to the 16-bit separator 154, a delay unit 185 identical in structure and operation to the delay unit 155, and a selector 186 identical in structure and operation to the selector 156. As shown in FIG. 15, the data deconcatenator 175 reads a 32-bit data unit from the one-port SRAM 174 in 1 cycle, deconcatenates the read 32-bit data unit into two 16-bit data units, and outputs the two 16-bit data units in 2 cycles. As shown in FIG. 15, the data read and write operations are repeated every cycle to the one-port SRAM 174 in the output buffer 116 in order to write and read the 32-bit data. The read and write operations are thus performed in parallel.

A portion enclosed by a broken-lined box in FIG. 14 is identical in structure to the intermediate calculation buffer 113 of FIG. 10.

The output buffer 116 stores the baseband image data onto the one-port SRAM 174 while reading the coefficient data from the one-port SRAM 174 and supplying the read coefficient data to the level-graded buffer section 120 in parallel with the baseband image data storage operation.

The flow of each process is described below. The inverse wavelet transform of the inverse wavelet transforming apparatus 100 of FIG. 5 is described below with reference to a flowchart of FIG. 16. When the inverse wavelet transform starts, a target precinct is initialized in step S101. In step S102, the controller 101 determines whether it is a predetermined timing. If it is determined in step S102 that it is a predetermined timing, processing proceeds to step S103. In step S103, the vertical synthesis filter 112 and the horizontal synthesis filter 114 perform the line-based inverse wavelet transform in order to generate one line of the coefficient data at a one-notch lower segmentation level or one line of the baseband image data. The line-based inverse wavelet transform is described in detail later.

When the line-based inverse wavelet transform is complete, processing proceeds to step S104. In step S104, the controller 101 determines whether all coefficient data in the precinct has been processed. If it is determined in step S104 that not all coefficient data has been processed, processing returns to step S102 to repeat step S102 and subsequent steps. If it is determined in step S104 that all coefficient data in the precinct has been processed, processing proceeds to step S105.

The controller 101 determines in step S105 whether all precincts within a picture have been processed. If it is determined in step S105 that an unprocessed precinct remains, processing proceeds to step S106. In step S106, the controller 101 updates the target precinct and handles a next precinct as a target. Subsequent to step S106, processing returns to step S102 to repeat step S102 and subsequent steps.

If it is determined in step S105 that all precincts within the picture have been processed, the inverse wavelet transform ends. The inverse wavelet transform is performed on a per picture basis.

Figure 16:
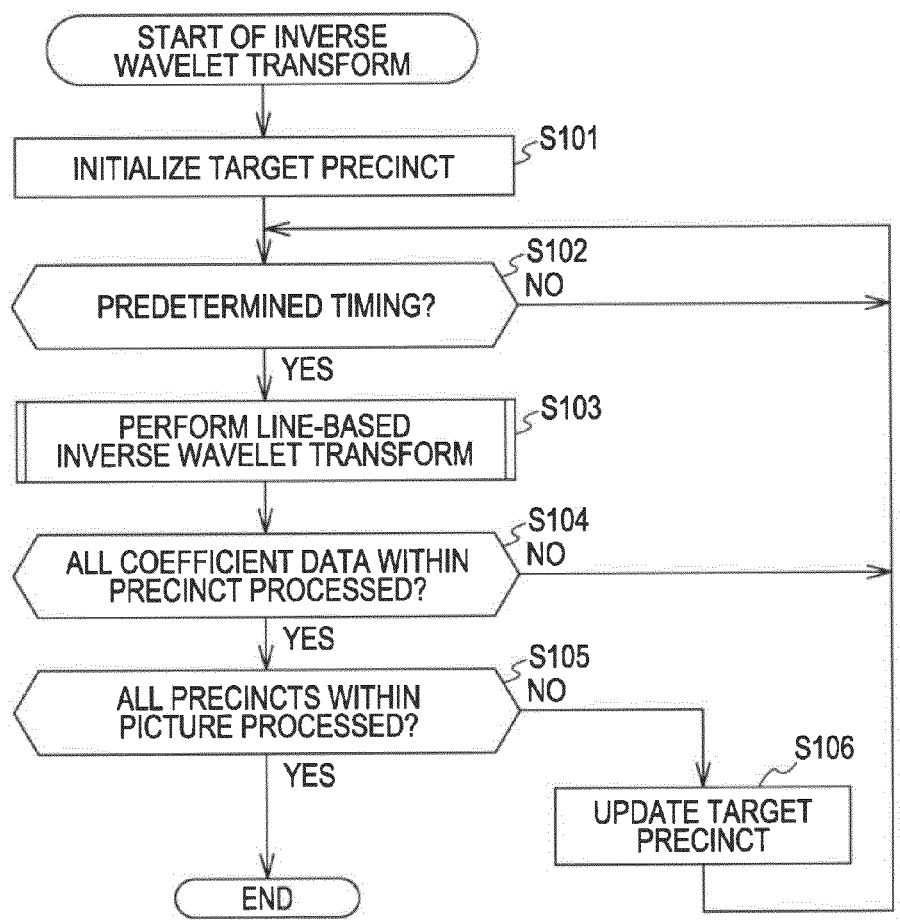
FIG. 16 is a flowchart illustrating the inverse wavelet transform.

The line-based inverse wavelet transform executed in step S103 of FIG. 16 is described below with reference to flowcharts of FIGS. 17 and 18.

When the line-based inverse wavelet transform is started, the controller 101 determines in step S121 whether baseband image data is present on the output buffer 116. As will be described later, two lines of the baseband image data are generated every line-based inverse wavelet transform. The generated baseband image data is output on a line-by-line basis. The remaining one line is stored on the output buffer 116 and is then output at a next predetermined timing (timing determined in step S102 of FIG. 16), in other words, at the execution of a next line-based inverse wavelet transform.

In step S121, the controller 101 determines whether the output buffer 116 stores the baseband image data generated in the preceding line-based inverse wavelet transform.

If it is determined in step S121 that no baseband image data is stored on the output buffer 116, processing proceeds to step S122.

In step S122, the controller 101 determines whether the level-graded buffer section 120 stores the coefficient data. In the inverse wavelet transform, each repeated synthesis filtering operation synthesizes one line of four subband coefficients, thereby generating two lines of low-frequency subbands at one notch lower segmentation level. One of the two lines is stored onto the level-graded buffer section 120 via the output buffer 116. In the line-based inverse wavelet transform, two lines of the baseband image data from the top of the picture are successively generated. If the level-graded buffer section 120 stores the coefficient, that coefficient is first processed.

If it is determined in step S122 that no coefficient is stored on the level-graded buffer section 120, processing proceeds to step S123. In step S123, the controller 101 sets the target segmentation level to the top segmentation level. Subsequent to step S123, processing proceeds to step S131 of FIG. 18.

Figure 17:
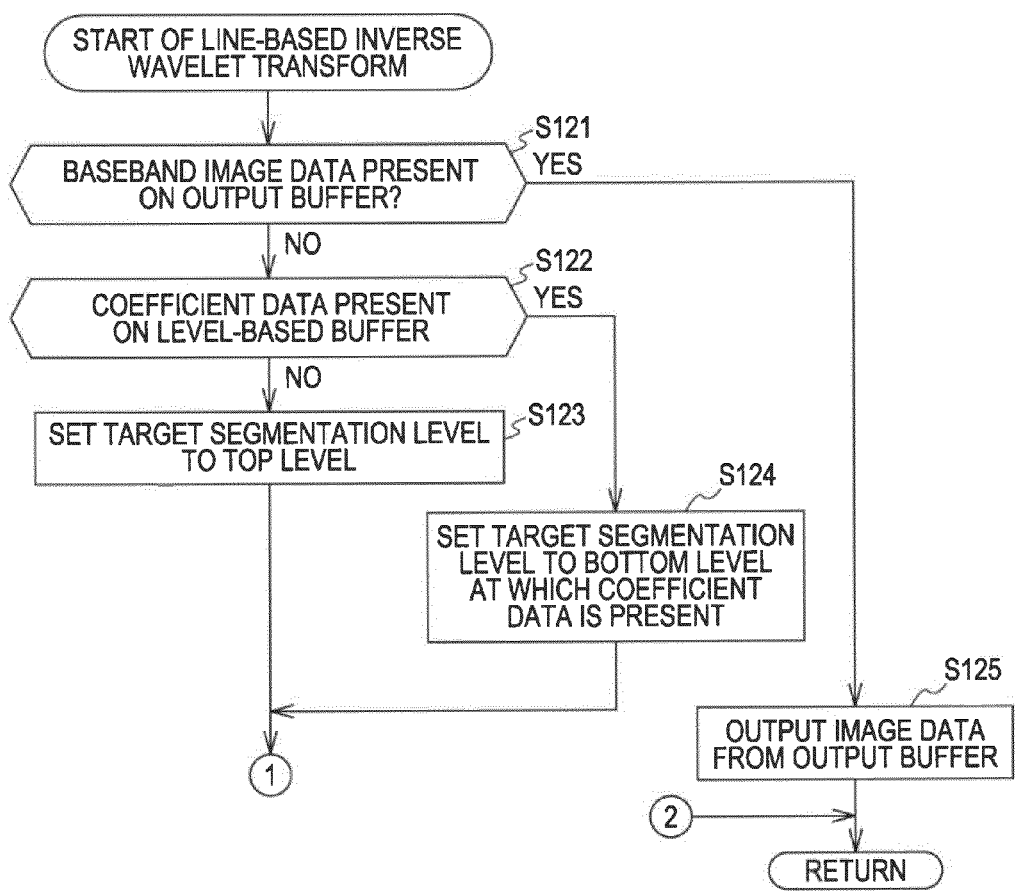
FIG. 17 is a flowchart illustrating a line-based inverse wavelet transform.

If it is determined in step S122 of FIG. 17 that the coefficient is stored on the level-graded buffer section 120, processing proceeds to step S124. In step S124, the controller 101 sets the target segmentation level to the lowest segmentation level where the coefficient data is present. Subsequent to step S124, processing proceeds to step S131 of FIG. 18.

Figure 18:
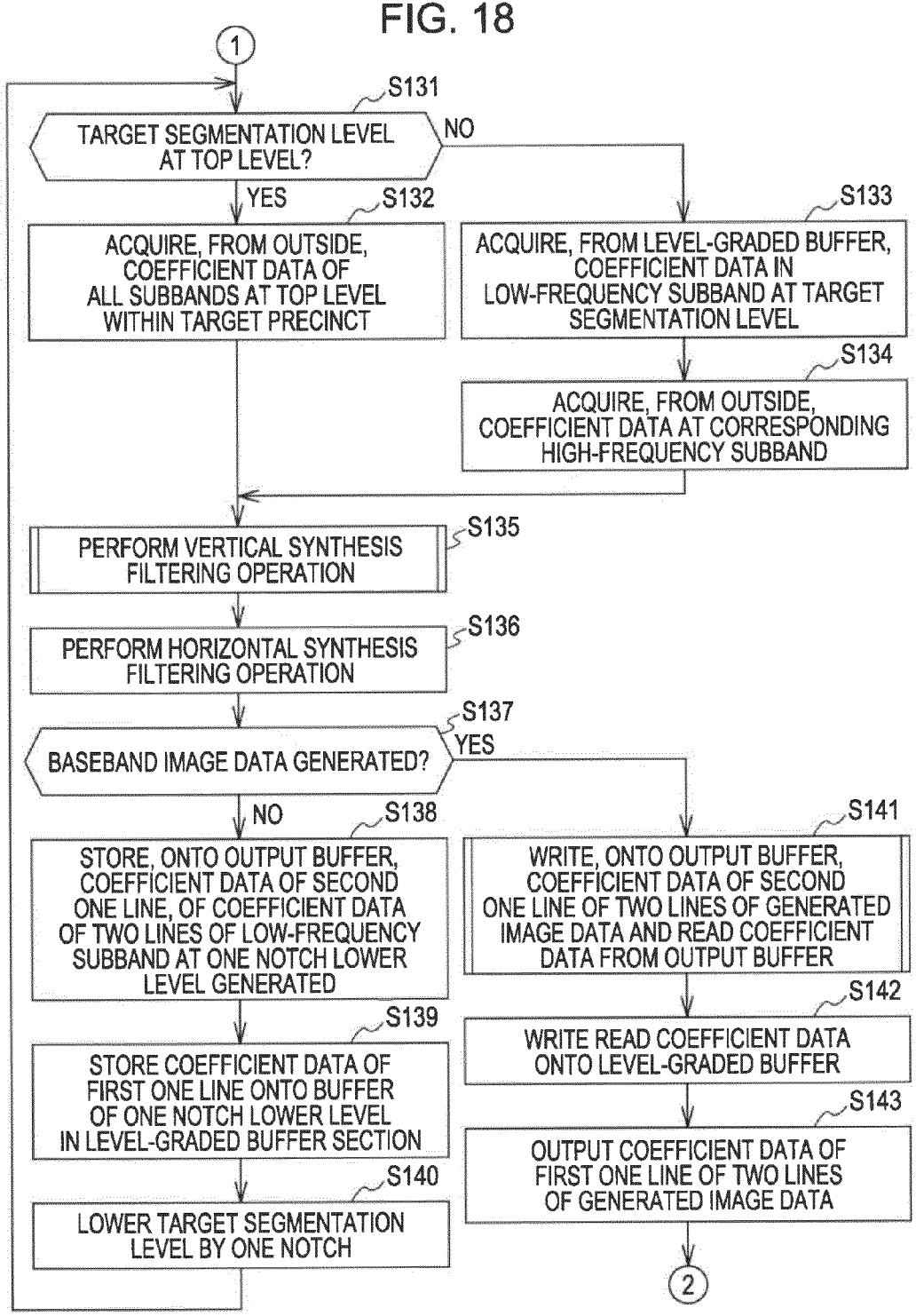
FIG. 18 is a continuation of the flowchart of FIG. 17.

In step S131 of FIG. 18, the controller 101 determines whether the target segmentation level is at the top segmentation level. If it is determined in step S131 that the target segmentation level is at the top segmentation level, processing proceeds to step S132. In step S132, the vertical synthesis filter 112 acquires the coefficient data at all subbands at the top segmentation level on the target precinct. When the coefficient data is acquired, processing proceeds to step S135. If it is determined in step S131 that the target segmentation level is not at the top segmentation level, processing proceeds to step S133. In step S133, the vertical synthesis filter 112 acquires the coefficient data in the low-frequency subbands at the target segmentation level from the buffer at the target segmentation level in the level-graded buffer section 120 via the selector 111. In step S134, the vertical synthesis filter 112 acquires the coefficient data in the high-frequency subband at the target segmentation level from the outside via the selector 111. Subsequent to step S134, processing proceeds to step S135.

In step S135, the vertical synthesis filter 112 performs the vertical filtering operation (vertical synthesis filtering operation). The vertical synthesis filtering operation will be described later. Subsequent to the end of the vertical synthesis filtering operation, the horizontal synthesis filter 114 executes the horizontal synthesis filtering operation.

In step S137, the controller 101 determines whether the baseband image data has been generated through the horizontal synthesis filtering operation in step S136. If it is determined in step S137 that the generated data is coefficient data in the intermediate calculation phase, processing proceeds to step S138. In step S138, the horizontal synthesis filter 114 causes the output buffer 116 to store via the selector 115 a latter one of the two lines of generated coefficient data in the low-frequency subband at a one-notch lower segmentation level.

In step S139, the horizontal synthesis filter 114 causes one-notch lower level buffer in the level-graded buffer section 120 to store a former one of the two lines of the coefficient data in the low-frequency subband at the one-notch lower segmentation level. In step S140, the controller 101 modifies the target segmentation level to a one-notch lower level. Subsequent to step S140, processing returns to step S131 to repeat step S131 and subsequent steps.

The inverse wavelet transforming apparatus 100 repeats steps S131 through S140 until two lines of the baseband image data are generated. The inverse wavelet transforming apparatus 100 thus performs the synthesis filtering operation at each level with the target segmentation level changed to a one-notch lower level.

The synthesis filtering operation is performed at a segmentation level of 1 and if it is determined in step S137 that the baseband image data is generated, processing proceeds to step S141. In step S141, the output buffer 116 acquires two lines of image data generated in the horizontal synthesis filter 114. The output buffer 116 performs a buffer input and output process to be discussed later. The output buffer 116 thus writes the latter one onto the internal one-port SRAM 174 while reading the coefficient data from the one-port SRAM 174.

In step S142, the output buffer 116 writes the read coefficient data onto the corresponding level buffers in the level-graded buffer section 120 via the selector 117. In step S143, the output buffer 116 outputs the former one of the two lines of the image data generated by the horizontal synthesis filter 114 from the inverse wavelet transforming apparatus 100 via the selector 117. Subsequent to step S143, the line-based inverse wavelet transform ends. Processing returns to step S103 of FIG. 16 so that step S104 and subsequent steps are performed.

If it is determined in step S121 of FIG. 17 that one line of the baseband image data is present on the output buffer 116, processing proceeds to step S125. In step S125, the output buffer 116 reads the one line of the baseband image data from the internal one-port SRAM 174 and outputs the read one of the baseband image data to the outside via the selector 117. When the image data is output, the line-based inverse wavelet transform is complete. Processing returns to step S103 of FIG. 16 so that step S104 and subsequent steps are performed.

The image data is thus generated in the synthesis filtering operation by two lines, and one of every two lines is stored on the output buffer 116. If the baseband image data is stored on the output buffer 116, that image data is output. If no baseband image data is stored on the output buffer 116, the synthesis filtering operation is performed to generate the image data. The inverse wavelet transforming apparatus 100 thus outputs the baseband image data with one line at a predetermined timing each time the line-based inverse wavelet transform is performed.

Figure 19:
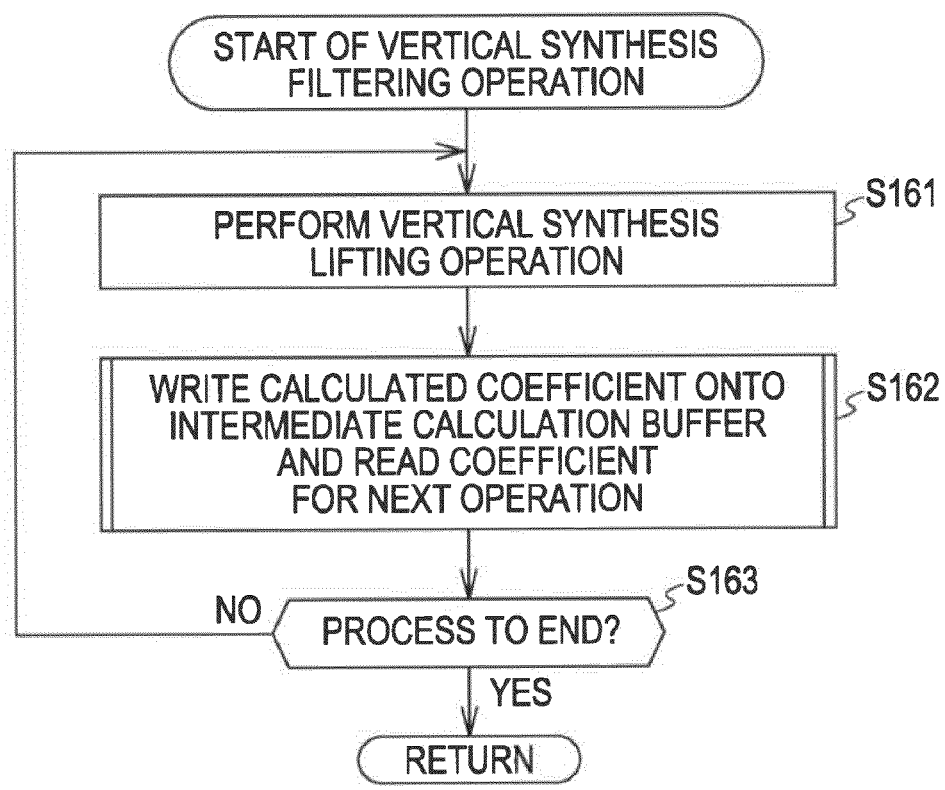
FIG. 19 is a flowchart illustrating the vertical synthesis filtering operation.

The vertical synthesis filtering operation executed in step S135 of FIG. 18 is described in detail below with reference to a flowchart of FIG. 19.

When the vertical synthesis filtering operation is started, the vertical synthesis filter 112 performs the vertical synthesis lifting operation described with reference to FIGS. 7 and 8 in step S161. In step S162, the vertical synthesis filter 112 performs a buffer input and output operation in step S162, thereby writing a coefficient calculated in the vertical synthesis lifting operation in step S161 onto the intermediate calculation buffer 113 while reading a coefficient for a next operation. The buffer input and output operation inputting and outputting data concurrently in parallel will be described later in detail.

Subsequent to the end of the buffer input and output operation, the vertical synthesis filter 112 determines in step S163 whether to end the vertical synthesis filtering operation. If it is determined in step S163 that an unprocessed coefficient remains with the vertical lifting operation not completed on all the currently acquired coefficient data, processing returns to step S161. Step S161 and subsequent steps are repeated. More specifically, the vertical lifting operation is performed on all acquired coefficients by repeating steps S161 and S162. If it is determined in step S163 that the vertical synthesis filtering operation is to be completed, in other words, if it is determined in step S163 that the vertical lifting operation has been completed on all currently acquired coefficients, the vertical synthesis filtering operation is to be completed.

Figure 20:
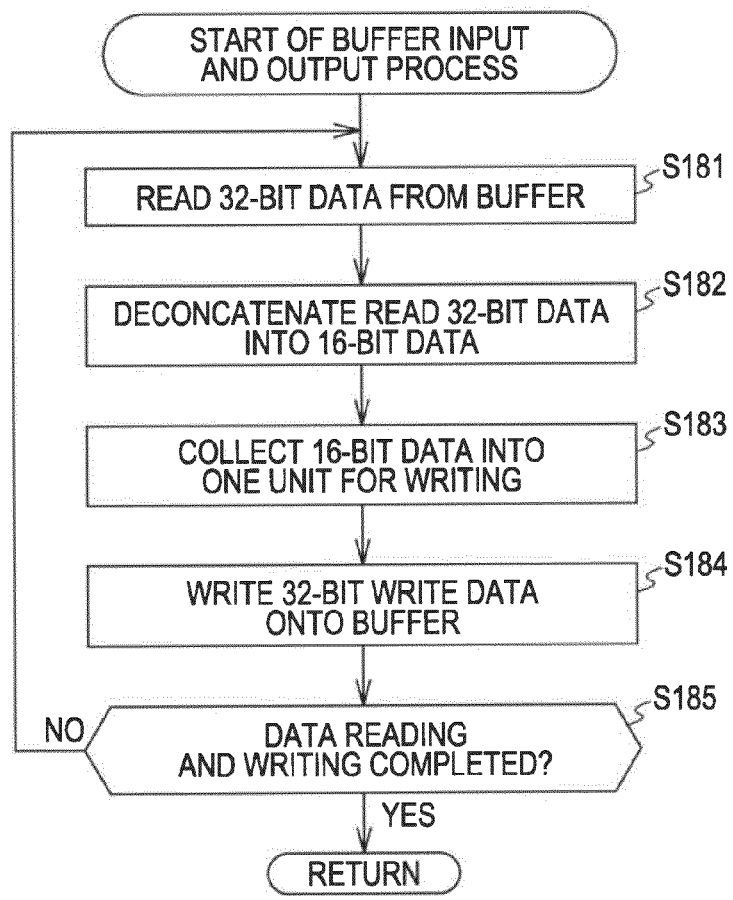
FIG. 20 is a flowchart illustrating a buffer input and output process.

The buffer input and output operation performed in step S162 of FIG. 19 by the intermediate calculation buffer 113 of FIG. 10 is described below with reference to a flowchart of FIG. 20.

When the buffer input and output operation is started, the data deconcatenator 143 reads in step S181 from the buffer, namely, the one-port SRAM 142 the 32-bit data specified by the vertical synthesis filter 112. In step S182, the data deconcatenator 143 deconcatenates the read 32-bit data into two 16-bit data units and then outputs the two 16-bit data units to the vertical synthesis filter 112. In step S183, the data concatenator 141 concatenates the two 16-bit data units supplied from the vertical synthesis filter 112 into a single 32-bit data unit. In step S184, the data concatenator 141 writes that write 32-bit data onto the one-port SRAM 142.

In step S185, each of the data concatenator 141 and the data deconcatenator 143 determines whether the data read and write operations have been completed. If it is determined in step S185 that any data remains to be written or remains to be read, processing returns to step S181 to repeat step S181 and subsequent steps. If it is determined in step S185 that the data read and write operations have been completed, the buffer input and output operation is then completed.

As previously discussed with reference to FIG. 13, the intermediate calculation buffer 113 alternates between the read operation and the write operation, thereby performing the two operations substantially concurrently in parallel.

As previously discussed with reference to FIG. 14, the output buffer 116 has the same structure as the intermediate calculation buffer 113 of FIG. 10. The output buffer 116 writes one line of the baseband image data and reads the coefficient data substantially concurrently in parallel. The buffer input and output operation in step S141 of FIG. 18 is performed in the same way as the process of the intermediate calculation buffer 113 discussed with reference to the flowchart of FIG. 20. The discussion of the flowchart of FIG. 20 is also applicable to the buffer input and output operation to be executed in step S141 of FIG. 18. The baseband image data to be written onto the one-port SRAM 174 is supplied to the horizontal synthesis filter 114 via the selector 115. The coefficient data of each segmentation level read from the one-port SRAM 174 is supplied to the level-graded buffer section 120 via the selector 117.

Figure 21:
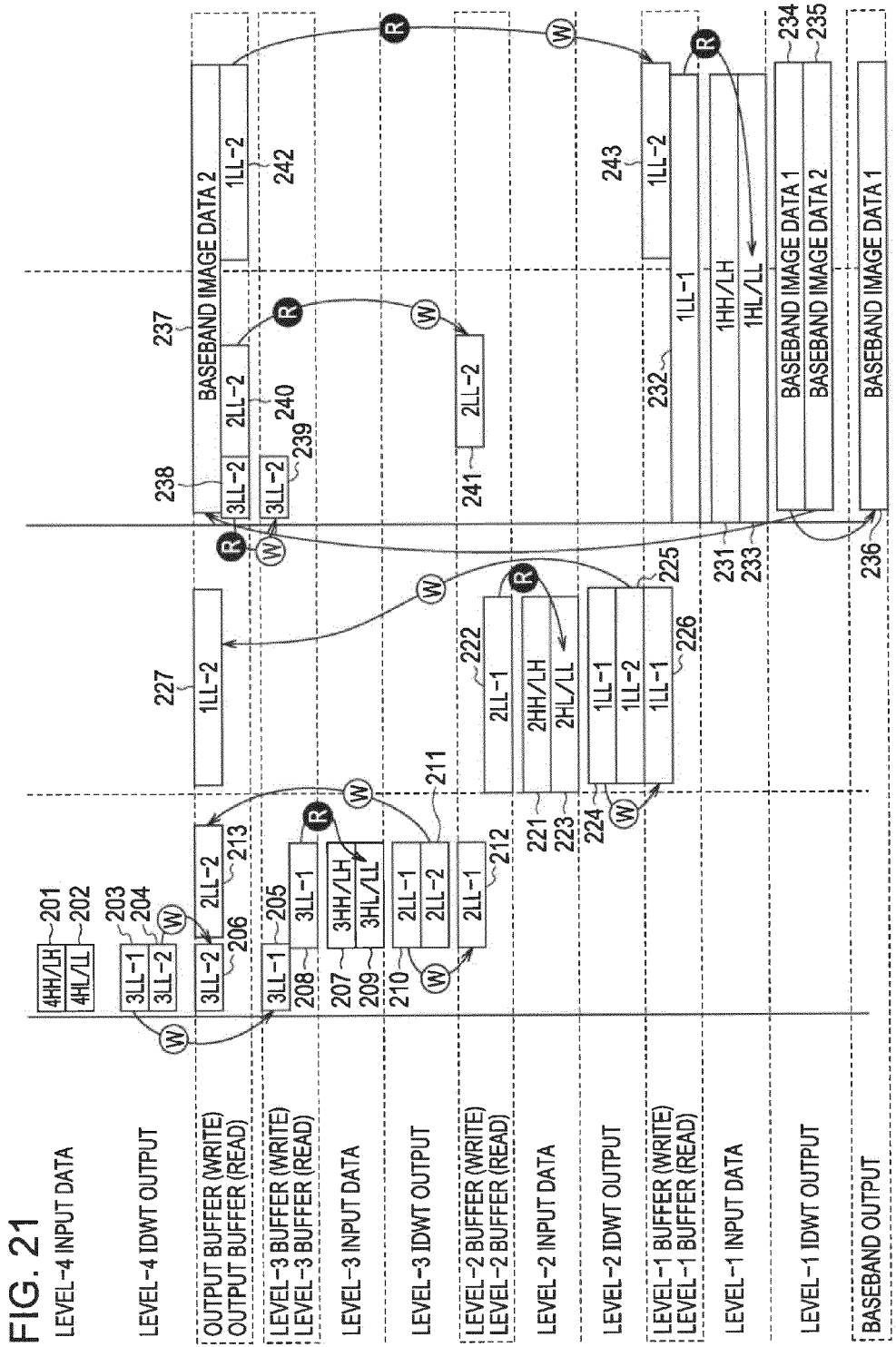
FIG. 21 illustrates the line-based inverse wavelet transform.

FIG. 21 diagrammatically illustrates the line-based inverse wavelet transform. As shown in FIG. 21, data transfer of the coefficient data at each segmentation level and buffer input and output operation is illustrated. The segmentation level of the coefficients is at level 4, namely, at the top level.

As shown in a top left portion of FIG. 21, the target segmentation level is set at the top level when the line-based inverse wavelet transform is started. The vertical synthesis filter 112 receives data 4HH/LH containing one line of coefficient data in a subband HH at a segmentation level of 4 and one line of coefficient data in a subband LH at a segmentation level 4 (data 201) and data 4HL/LL containing one line of coefficient data in a subband HL at a segmentation level of 4 and one line of coefficient data in subband LL at a segmentation level 4 (data 202) from a preceding process (not shown) or a memory (not shown) in the inverse wavelet transforming apparatus 100. The vertical synthesis filter 112 thus receives one line in each subband at a segmentation level of 4.

The vertical synthesis filter 112 and the horizontal synthesis filter 114 perform the synthesis filtering operation on these coefficients, thereby generating coefficient lines 3LL-1 (data 203) and data 3LL-2 (data 204) in the low-frequency subband at a one-notch lower level. Each of the vertical synthesis filter 112 and the horizontal synthesis filter 114 therefore generates two lines in the low-frequency subbands at a one-notch lower level (segmentation level of 3).

The data 3LL-1 (data 203) is supplied to the level-3 buffer 121 in the level-graded buffer section 120 via the selector 115 for storage (data 205). The other data 3LL-2 (data 204) is written onto the output buffer 116 (data 206).

The target segmentation level is set to a one-notch lower level (segmentation level of 3). The vertical synthesis filter 112 acquires coefficients in the high-frequency subband at a segmentation level of 3 from the outside on a per line basis while reading and acquiring the data 3LL-1 (data 208) from the level-3 buffer 121 (data 209). The vertical synthesis filter 112 thus receives coefficients in each subband at a segmentation level of 3 on a line-by-line basis, such as the data 3HH/LH (data 207) and the data 3HL/LL (data 209). The data 3HH/LH indicates one coefficient line in the subband HH and one coefficient line in the subband LH at a segmentation level of 3. The data 3HL/LL indicates one coefficient line in the subband HL and one coefficient line in the subband LL at a segmentation level of 3.

The vertical synthesis filter 112 and the horizontal synthesis filter 114 perform the synthesis filtering operation on these coefficients, thereby generating coefficient lines 2LL-1 (data 210) and data 2LL-2 (data 211) in the low-frequency subband at a one-notch lower level. Each of the vertical synthesis filter 112 and the horizontal synthesis filter 114 therefore generates two lines in the low-frequency subbands at a one-notch lower level (segmentation level of 2).

The data 2LL-1 (data 210) is supplied to the level-2 buffer 122 in the level-graded buffer section 120 via the selector 115 for storage (data 212). The other data 2LL-2 (data 211) is written onto the output buffer 116 (data 213).

The target segmentation level is set to a one-notch lower level, namely, a segmentation level of 2. The vertical synthesis filter 112 acquires coefficients in the high-frequency subband at a segmentation level of 2 from the outside on a per line basis while reading and acquiring the data 2LL-1 from the level-2 buffer 122 (data 222). The vertical synthesis filter 112 receives coefficients in each subband at a segmentation level of 2 on a line-by-line basis, such as data 2HH/LH (data 221) and data 2HL/LL (data 223). The data 2HH/LH indicates one coefficient line in the subband HH and one coefficient line in the subband LH at a segmentation level of 2. The data 2HL/LL indicates one coefficient line in the subband HL and one coefficient line in the subband LL at a segmentation level of 2.

The vertical synthesis filter 112 and the horizontal synthesis filter 114 perform the synthesis filtering operation on these coefficients, thereby generating coefficient lines 1LL-1 (data 224) and data 1LL-2 (data 225) in the low-frequency subband at a one-notch lower level. Each of the vertical synthesis filter 112 and the horizontal synthesis filter 114 therefore generates two lines in the low-frequency subbands at a one-notch lower level (segmentation level of 1).

The data 1LL-1 (data 224) is supplied to the level-1 buffer 123 in the level-graded buffer section 120 via the selector 115 for storage (data 226). The other data 1LL-2 (data 225) is written onto the output buffer 116 (data 227).

The target segmentation level is set to a one-notch lower level, namely, a segmentation level of 1. The vertical synthesis filter 112 acquires coefficients in the high-frequency subband at a segmentation level of 1 from the outside on a per line basis while reading and acquiring the data 1LL-1 from the level-1 buffer 123 (data 232). The vertical synthesis filter 112 receives coefficients in each subband at a segmentation level of 1 on a line-by-line basis, such as data 1HH/LH (data 231) and data 1HL/LL (data 233). The data 2HH/LH indicates one coefficient line in the subband HH and one coefficient line in the subband LH at a segmentation level of 1. The data 2HL/LL indicates one coefficient line in the subband HL and one coefficient line in the subband LL at a segmentation level of 1.

The vertical synthesis filter 112 and the horizontal synthesis filter 114 perform the synthesis filtering operation on these coefficients, thereby generating baseband image data 1 (data 234) and baseband image data 2 (data 235), each indicating one line of baseband image data. More specifically, the vertical synthesis filter 112 and the horizontal synthesis filter 114 perform the synthesis filtering operation, thereby generating two lines of the baseband image data.

The baseband image data 1 (data 234) is output (data 236). The other baseband image data 2 (data 235) is written onto the output buffer 116 (data 237). Concurrently with and in parallel with the writing onto the output buffer 116, the data 3LL-2 (data 238) as the coefficient in the low-frequency subband at a segmentation level 3 is read and then stored onto the level-3 buffer 121 in the level-graded buffer section 120 (data 239). The data 2LL-2 (data 240) as the coefficient in the low-frequency subband at a segmentation level of 2 is read and stored onto the level-2 buffer 122 in the level-graded buffer section 120 (data 241). The data 1LL-2 (data 242) as the coefficient in the low-frequency subband at a segmentation level of 1 is read and stored onto the level-1 buffer 123 in the level-graded buffer section 120 (data 243).

Data is processed as shown in FIG. 21 each time the line-based inverse wavelet transform discussed with reference to FIGS. 17 and 18 is performed. The baseband image data 2 (data 237) stored on the output buffer 116 is output to the outside at a next line-based inverse wavelet transform. The coefficient stored on each buffer in the level-graded buffer section 120 is processed at a subsequent next line-based inverse wavelet transform.

The synthesis filtering operation at each segmentation level generates two lines of coefficients at a one-notch lower level, but only one line is processed at a time. More specifically, one line of the two generated lines is used in a next synthesis filtering operation, but the other line remains unnecessary until a subsequent line-based inverse wavelet transform is performed. It is thus unnecessary to store the two generated lines onto the level-graded buffer section 120 at the same time. The inverse wavelet transforming apparatus 100 thus shifts the storage timings of the two lines one from the other so that the coefficient data is stored on the level-graded buffer section 120 one line at a time. This arrangement reduces the memory capacity required of the level-graded buffer section 120.

The level-graded buffer section 120 frequently supplies the coefficients thereof to the vertical synthesis filter 112 via the selector 111. If the level-graded buffer section 120 is constructed of a memory permitting low-speed accessing, such as an external memory, process speed of the synthesis filtering operation is substantially reduced. The external memory typically uses a shared bus for data reading. Latency involved in the inverse wavelet transform greatly increases. Like a cache memory, the level-graded buffer section 120 is preferably arranged in a large-scale integrated (LSI) chip containing a CPU performing the synthesis filtering operation. The level-graded buffer section 120 thus permits high-speed accessing without passing through a shared bus.

If the memory capacity of the cache memory increases, the circuit scale also increases, and the chip size of the LSI chip is enlarged. More specifically, an increase in the memory capacity of the cache memory leads to an increase in the manufacturing costs of the apparatus. In practice, there is a limitation on the memory capacity of the cache memory. In view of cost reductions, a small memory capacity is preferable.

If an amount of data to be stored onto the level-graded buffer section 120 increases, a small-capacity cache memory becomes insufficient. In such a case, an external memory operating at a low speed may be used as a buffer memory. The use of such a buffer memory increases the latency in the inverse wavelet transform. The latency is expected to increase even more due to a mishit process performed in and data saving occurring in the cache memory.

The coefficients generated in the synthesis filtering operation are stored onto the level-graded buffer section 120 on a line-by-line basis so that the memory capacity required of the level-graded buffer section 120 is reduced. Increases in latency and manufacturing costs are thus reduced.

The inverse wavelet transforming apparatus 100 stores on the output buffer 116 one of the two lines generated in the synthesis filtering operation but not immediately used.

The output buffer 116 is intended to store one of the two lines of the baseband image data generated so that the baseband image data is output one line at a time. In other words, the output buffer 116 is not used until the baseband image data is generated. During the unused period of the output buffer 116, the coefficient not immediately stored on the level-graded buffer section 120 is temporarily stored onto the output buffer 116 until the synthesis filtering operation has been completed on the coefficient stored on the level-graded buffer section 120. More specifically, the storage timing to the level-graded buffer section 120 is shifted using the output buffer 116.

As the level-graded buffer section 120, the output buffer 116 is preferably constructed of a high-speed cache memory in order to reduce the latency in the inverse wavelet transform. By storing the coefficient during an unused time (with no baseband image data stored), the coefficients generated in the synthesis filtering operation are stored onto the level-graded buffer section 120 line by line without increasing the memory capacity of the cache memory (output buffer 116).

The memory capacity of the buffer memory storing data in the inverse wavelet transform in the inverse wavelet transforming apparatus 100 is reduced by increasing the utilization efficiency of the cache memory buffering the coefficient data and the image data.

Saving onto an external memory the coefficient not immediately stored on the level-graded buffer section 120 may be contemplated. Timing control to prevent the latency from being prolonged becomes complex. Using the output buffer 116, the coefficients generated in the synthesis filtering operation are easily stored onto the level-graded buffer section 120 on a line-by-line basis.

The output buffer 116 writes the baseband image data and reads the coefficients substantially concurrently in parallel as previously discussed with reference to the block diagram of FIG. 14 and the flowchart of FIG. 20. This arrangement controls an increase in the latency caused by movement of the coefficients from the output buffer 116 to the level-graded buffer section 120.

Figure 22:
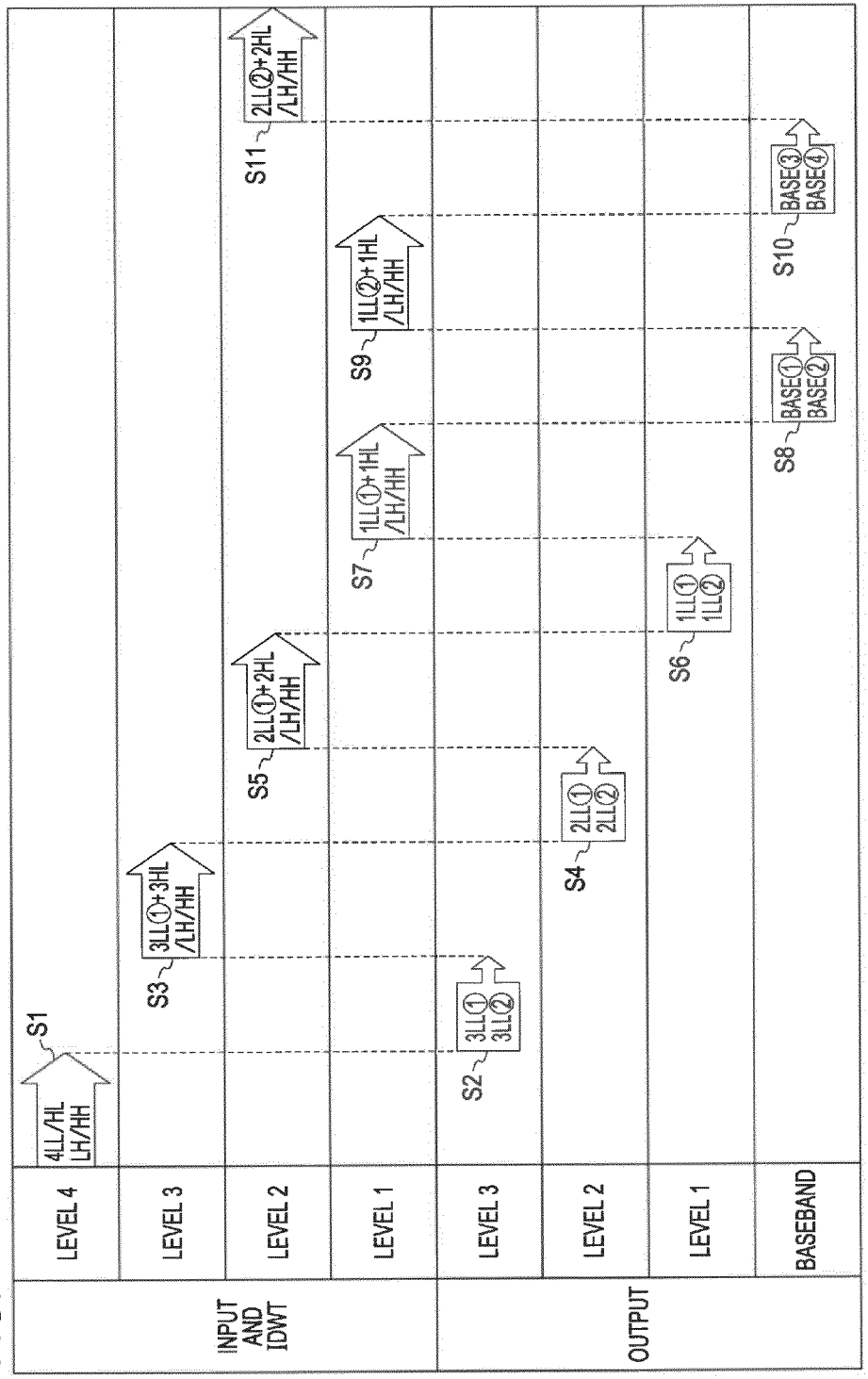
FIG. 22 illustrates the line-based inverse wavelet transform of one precinct.
Figure 23:
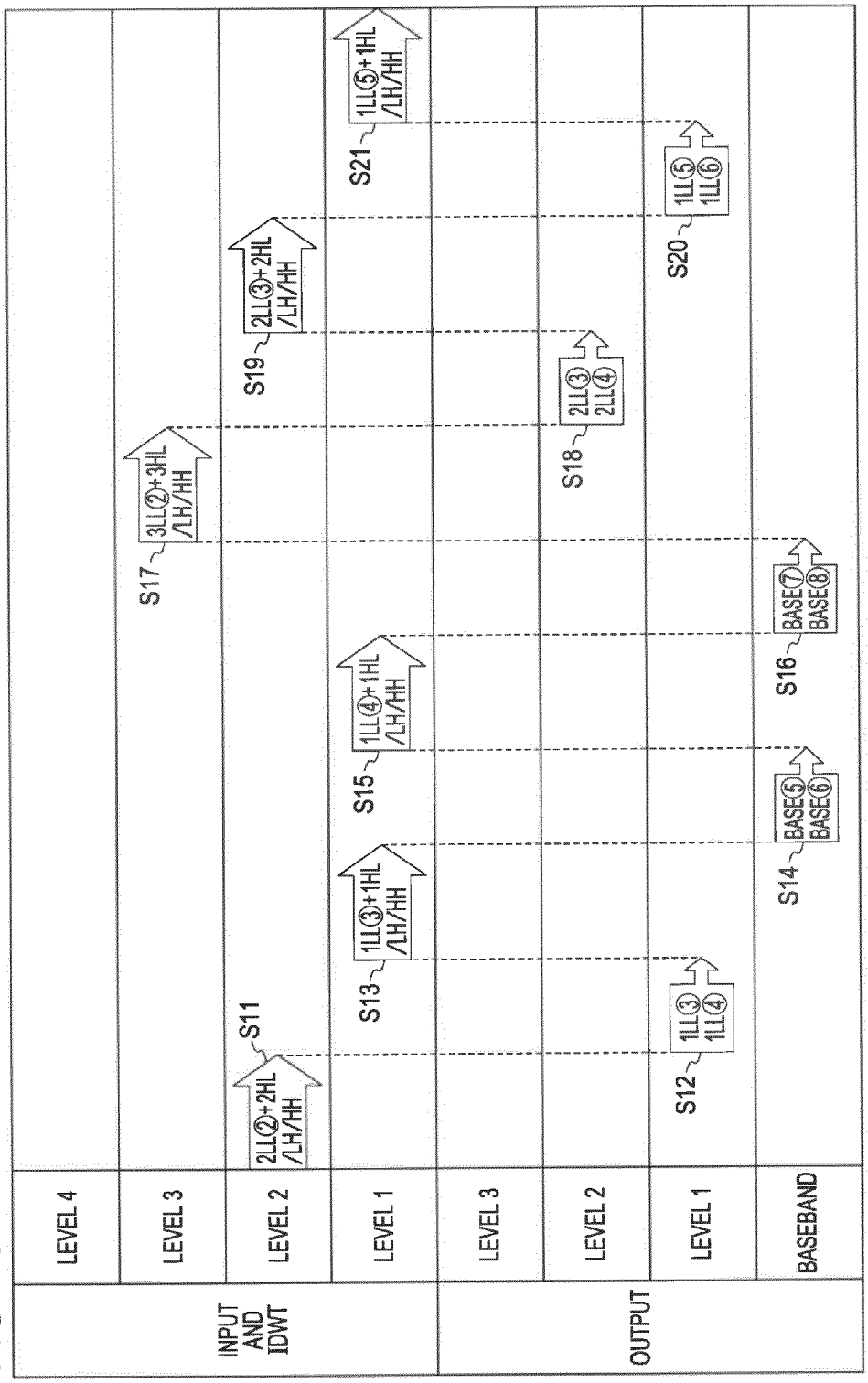
FIG. 23 is a continuation of the chart of FIG. 22.
Figure 24:
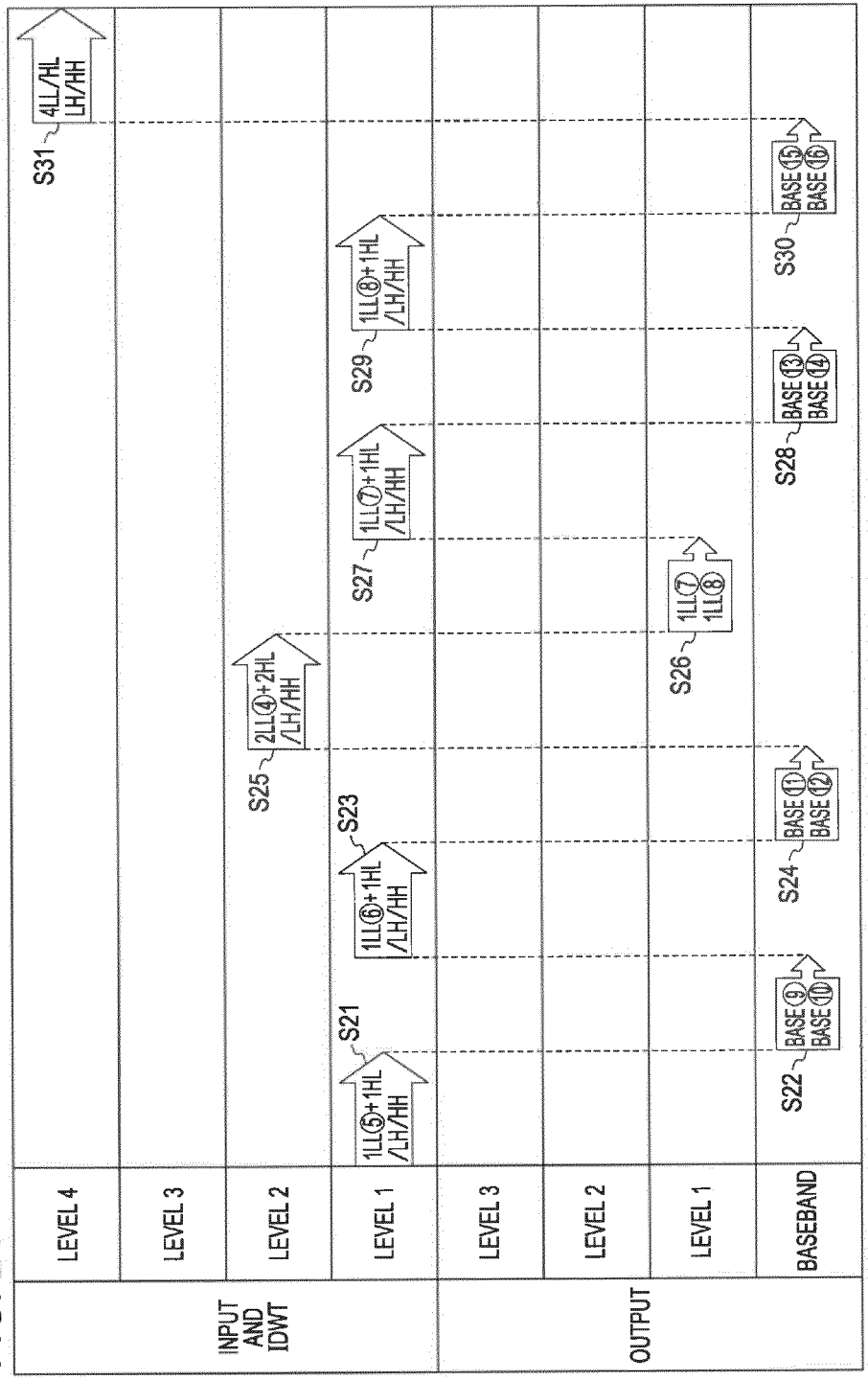
FIG. 24 is a continuation of the chart of FIG. 23.

The inverse wavelet transform of one precinct is described below with reference to FIGS. 22 through 24. As shown in FIGS. 22 through 24, circled numbers are line identification numbers within the precinct. In the discussion that follows, the circled numbers are not particularly quoted. Described below is the inverse wavelet transform performed on the coefficients wavelet transformed to a segmentation level of 4.

A first line-based inverse wavelet transform is started as shown in FIG. 22. The synthesis filtering operation is performed on coefficient lines at a segmentation level of 4, namely, top segmentation level (4LL/HL/LH/HH) (arrow S1). This synthesis filtering operation generates a first coefficient line 3LL1 and a second coefficient line 3LL2 in the low-frequency subband at a segmentation level of 3 (arrow S2). The synthesis filtering operation is performed on the first coefficient line 3LL1 and each of newly input coefficient lines in the high-frequency subbands at a segmentation level of 3 (3HL/LH/HH) (arrow S3). A first coefficient line 2LL1 and a second coefficient line 2LL2 in the low-frequency subband at a segmentation level of 2 are generated (arrow 4). The synthesis filtering operation is performed on the first coefficient line 2LL1 and each of newly input coefficient lines in the high-frequency subbands at a segmentation level of 2 (2HL/LH/HH) (arrow S5). A first coefficient line 1LL1 and a second coefficient line 1LL2 in the low-frequency subbands at a segmentation level of 1 are generated (arrow S6). The synthesis filtering operation is performed on the first coefficient line 1LL1 and each of newly input coefficient lines in the high-frequency subbands at a segmentation level of 1 (1HL/LH/HH) (arrow S7). A first line baseband image data base 1 and a second line baseband image data 2 are generated (arrow S8).

The first line baseband image data base 1 is immediately output. The second line baseband image data base 2 is stored onto the output buffer 116 and then output at a next output timing (a second line-based inverse wavelet transform).

When a third line-based inverse wavelet transform is started, the level-graded buffer section 120 stores the second coefficient line 3LL2 at the low-frequency subband at a segmentation level of 3 generated in the first line-based inverse wavelet transform, the second coefficient line 2LL2 in the low-frequency subband at a segmentation level of 2, and the second coefficient line 1LL2 in the low-frequency subband at a segmentation level of 1. In the third line-based inverse wavelet transform, the second coefficient line 1LL2 in the low-frequency subband at a segmentation level of 1 (lowest segmentation level) is processed. More specifically, the synthesis filtering operation is performed on the second coefficient line 1LL2 in the low-frequency subband at a segmentation level of 1 and each of newly input coefficient lines in the high-frequency subband at a segmentation level of 1 (1HL/LH/HH) (arrow S9). A third line baseband image data base 3 and a fourth line baseband image data base 4 are generated (arrow S10).

The third line baseband image data base 3 is immediately output. The fourth line baseband image data base 4 is stored onto the output buffer 116 and then output at a next output timing (at a fourth line-based inverse wavelet transform).

When a fifth line-based inverse wavelet transform is started, the level-graded buffer section 120 stores the third coefficient line 3LL2 in the low-frequency subband at a segmentation level of 3 and the second coefficient line 2LL2 in the low-frequency subband at a segmentation level of 2 because the second segmentation level 1LL2 in the low-frequency subband at a segmentation level of 1 has already been processed. In the fifth line-based inverse wavelet transform, the second coefficient line 2LL2 in the low-frequency subband at a segmentation level of 2 as the lowest segmentation level of the coefficient lines is to be processed. The synthesis filtering operation is performed on the second coefficient line 2LL2 in the low-frequency subband at a segmentation level of 2 and each of newly input coefficient lines in the high-frequency subbands at a segmentation level of 2 (2HL/LH/HH) (arrow S11). As shown in FIG. 23, a third coefficient line 1LL3 and a fourth coefficient line 1LL4 in the low-frequency subband at a segmentation level of 1 are generated (arrow S12). The synthesis filtering operation is then performed on the third coefficient line 1LL3 in the low-frequency subband at a segmentation level of 1 and each of newly input coefficient lines in the high-frequency subband at a segmentation level of 1 (1HL/LH/HH) (arrow S13). A fifth line baseband image data base 5 and a sixth line baseband image data base 6 are generated (arrow S14).

The fifth line baseband image data base 5 is immediately output. The sixth line baseband image data base 6 is temporarily stored on the output buffer 116 and then output at a next output timing (at a sixth line-based inverse wavelet transform).

When a seventh line-based inverse wavelet transform is started, the level-graded buffer section 120 stores the second coefficient line 3LL2 in the low-frequency subband at a segmentation level of 3 generated in the first line-based inverse wavelet transform and the fourth coefficient line 1LL4 in the low-frequency subband at a segmentation level of 1 generated in the fifth line-based inverse wavelet transform. In the seventh line-based inverse wavelet transform, the fourth coefficient line 1LL4 in the low-frequency subband at a segmentation level of 1 as the lowest segmentation level of the coefficient lines is to be processed. The synthesis filtering operation is performed on the fourth coefficient line 1LL4 in the low-frequency subband at a segmentation level of 1 and each of newly input coefficient lines in the high-frequency subbands at a segmentation level of 1 (1HL/LH/HH) (arrow S15). A seventh baseband image data base 7 and an eighth baseband image data base 8 are generated (arrow S16).

The seventh line baseband image data base 7 is immediately output. The eighth line baseband image data base 8 is temporarily stored on the output buffer 116 and then output at a next output timing (at an eighth line-based inverse wavelet transform).

When a ninth line-based inverse wavelet transform is started, the level-graded buffer section 120 stores only the second coefficient line 3LL2 in the low-frequency subband at a segmentation level of 3 generated in the first line-based inverse wavelet transform. In the ninth line-based inverse wavelet transform, the second coefficient line 3LL2 in the low-frequency subband at a segmentation level of 3 is to be processed. The synthesis filtering operation is performed on the second coefficient line 3LL2 in the low-frequency subband at a segmentation level of 3 and each of newly input coefficient lines in the high-frequency subbands at a segmentation level of 3 (3HL/LH/HH) (arrow S17). A third coefficient line 2LL3 and a fourth coefficient line 2LL4 in the low-frequency subband at a segmentation level of 2 are generated (arrow 18). The synthesis filtering operation is further performed on the third coefficient line 2LL3 in the low-frequency subband at a segmentation level of 2 and each of newly input coefficient lines in the high-frequency subband at a segmentation level of 2 (2HL/LH/HH) (arrow S19). A fifth coefficient line 1LL5 and a sixth coefficient line 1LL6 in the low-frequency subband at a segmentation level of 1 are generated (arrow S20). The synthesis filtering operation is further performed on the fifth coefficient line 1LL5 in the low-frequency subband at a segmentation level of 1 and each of newly input coefficient lines in the high-frequency subbands at a segmentation level of 1 (1HL/LH/HH) (arrow S21). As shown in FIG. 24, a ninth baseband image data base 9 and a tenth baseband image data base 10 are thus generated (arrow S22).

The seventh line baseband image data base 9 is immediately output. The eighth line baseband image data base 10 is temporarily stored on the output buffer 116 and then output at a next output timing (at a tenth line-based inverse wavelet transform).

When an eleventh line-based inverse wavelet transform is started, the level-graded buffer section 120 stores the fourth coefficient line 2LL4 in the low-frequency subband at a segmentation level of 2 and the sixth coefficient line 1LL6 in the low-frequency subband at a segmentation level of 1 generated in the ninth line-based inverse wavelet transform. In the eleventh line-based inverse wavelet transform, the sixth coefficient line 1LL6 in the low-frequency subband at a segmentation level of 1 as the lowest segmentation level of the coefficient lines is to be processed. The synthesis filtering operation is performed on the sixth coefficient line 1LL6 in the low-frequency subband at a segmentation level of 1 and each of newly input coefficient lines in the high-frequency subbands at a segmentation level of 1 (1HL/LH/HH) (arrow S23). An eleventh baseband image data base 11 and a twelfth baseband image data base 12 are generated (arrow S24).

The eleventh line baseband image data base 11 is immediately output. The twelfth line baseband image data base 12 is temporarily stored on the output buffer 116 and then output at a next output timing (at a twelfth line-based inverse wavelet transform).

When a thirteenth line-based inverse wavelet transform is started, the level-graded buffer section 120 stores the fourth coefficient line 2LL4 in the low-frequency subband at a segmentation level of 2 because the sixth coefficient line 1LL6 in the low-frequency subband at a segmentation level of 1 has already been processed. In the thirteenth line-based inverse wavelet transform, the fourth coefficient line 2LL4 in the low-frequency subband at a segmentation level of 2 is to be processed. The synthesis filtering operation is performed on the fourth coefficient line 2LL4 in the low-frequency subband at a segmentation level of 2 and each of newly input coefficient lines in the high-frequency subbands at a segmentation level of 2 (2HL/LH/HH) (arrow S25). A seventh coefficient line 1LL7 and an eighth coefficient line 1LL8 in the low-frequency subband at a segmentation level of 1 are generated (arrow S26). The synthesis filtering operation is further performed on the seventh coefficient line 1LL7 in the low-frequency subband at a segmentation level of 1 and each of newly input coefficient lines in the high-frequency subbands at a segmentation level of 1 (1HL/LH/HH) (arrow S27). A thirteenth baseband image data base 13 and a fourteenth baseband image data base 14 are generated (arrow S28).

The thirteen line baseband image data base 13 is immediately output. The fourteenth line baseband image data base 14 is temporarily stored on the output buffer 116 and then output at a next output timing (at a fourteenth line-based inverse wavelet transform).

When a fifteenth line-based inverse wavelet transform is started, the level-graded buffer section 120 stores the eighth coefficient line 1LL8 in the low-frequency subband at a segmentation level of 1 generated in the thirteenth line-based inverse wavelet transform. In the fifteenth line-based inverse wavelet transform, the eighth coefficient line 1LL8 in the low-frequency subband at a segmentation level of 1 is to be processed. The synthesis filtering operation is performed on the eighth coefficient line 1LL8 in the low-frequency subband at a segmentation level of 1 and each of newly input coefficient lines in the high-frequency subbands at a segmentation level of 1 (1HL/LH/HH) (arrow S29). A fifteenth baseband image data base 15 and a sixteenth baseband image data base 16 are generated (arrow S30).

The fifteenth line baseband image data base 15 is immediately output. The sixteenth line baseband image data base 16 is temporarily stored on the output buffer 116 and then output at a next output timing (at a sixteenth line-based inverse wavelet transform).

By repeating the line-based inverse wavelet transform by sixteen times, the baseband image data (16 lines) of one precinct is generated and output. The same process described above is repeated to a next precinct (arrow S31).

By repeating the line-based inverse wavelet transform, the inverse wavelet transforming apparatus 100 generates two lines of the coefficient data and outputs one of the two lines. The synthesis filtering operation is thus performed. The inverse wavelet transforming apparatus 100 outputs the baseband image data at a predetermined timing.

The inverse wavelet transforming apparatus 100 generates two lines of the baseband image data at a time. In this case, the inverse wavelet transforming apparatus 100 performs only the synthesis filtering operation for the generation of the two lines. More specifically, the inverse wavelet transforming apparatus 100 stores on the output buffer one line of the two coefficient lines generated in the synthesis filtering operation while storing the other line on the level-graded buffer section 120. The one line stored on the level-graded buffer section 120 is then used in the next synthesis filtering operation with a higher priority in order to generate two coefficient lines. The inverse wavelet transforming apparatus 100 repeats this operation until the baseband image data is generated. When all coefficients stored on the level-graded buffer section 120 are processed, the inverse wavelet transforming apparatus 100 reads the coefficient from the output buffer 116 and causes the level-graded buffer section 120 to store the read coefficient. The inverse wavelet transforming apparatus 100 then performs the synthesis filtering operation on the coefficient and a coefficient at a lower segmentation level with a higher priority. The inverse wavelet transforming apparatus 100 also repeats the synthesis filtering operation.

The inverse wavelet transforming apparatus 100 not only generates two lines of the baseband image data at a time in a direction downward from the top but also reduces the workload involved in the generation of the two lines of the baseband image data. This arrangement reduces the coefficient data and the baseband image data, generated in the synthesis filtering operation, leading to a smaller memory capacity requirement in the buffer. The manufacturing costs of the apparatus are also reduced.

When the two lines of the baseband image data are generated, the inverse wavelet transforming apparatus 100 performs only the synthesis filtering operation for the generation of the two lines. Generation intervals of the generation of the two lines of the baseband image data are shortened. More specifically, the inverse wavelet transforming apparatus 100 outputs the baseband image data with one line at a time at shorter intervals.

The image data processed by the inverse wavelet transforming apparatus 100 may be a television signal, for example. As described above, the inverse wavelet transforming apparatus 100 outputs one line of the baseband image data at a time. The interval of the outputting of the one line may be synchronized with a horizontal synchronization timing of the television signal. The inverse wavelet transforming apparatus 100 can thus generate the television signal on a real-time basis (immediately). More specifically, the inverse wavelet transforming apparatus 100 performs the inverse wavelet transform on the input coefficient data on a real-time basis so that output image data is displayed on a monitor without buffering. The term "on a real-time basis" means that the baseband image data is output one line at a time in synchronization with the horizontal synchronization timing of the television signal and does not means that the latency in the wavelet transform is zero.

Figure 25:
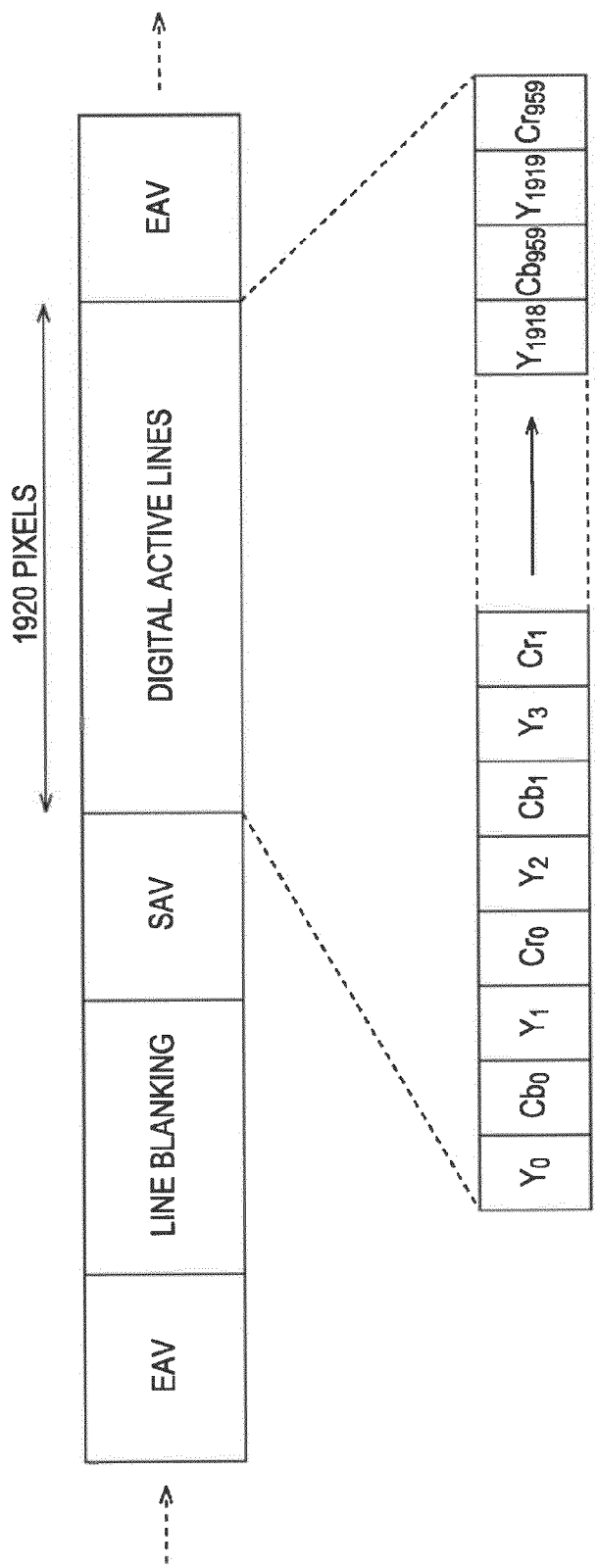
FIG. 25 illustrates a data arrangement of a luminance signal and color difference signals in accordance with high-definition television (HDTV) standards.

FIG. 25 diagrammatically illustrates a 1.5 Gbps high-definition serial digital interface (HD-SDI) signal defined in Society of Motion Picture and Television Engineers (SMPTE). The HD-SDI signal has 10 bit multiplexed samples of in YCbCr of 4:2:2 format and a resolution of 1920×1080. In this data format, Y (luminance) and Cb and Cr (color difference) signals are multiplexed in baseband data of 1920 pixels between a start of active video (SAV) and an end of active video (EAV). Line blanking indicating a horizontal blanking period is arranged between the EAV and a next SAV.

To generate the baseband image data in such a data format on a real-time basis, the inverse wavelet transforming apparatus 100 generates the baseband image data between the SAV and the next SAV. When the two lines of the baseband image data are generated, the inverse wavelet transforming apparatus 100 performs only the synthesis filtering operation required for the generation of the two lines. One line of the baseband image data is output at a shorter interval. One line of the baseband image data is thus easily output every SAV.

Together with other processes such as entropy encoding and entropy decoding, the above-described wavelet transform and inverse wavelet transform may be applied in an image data transmission system and an image data recording and reproducing system.

Figure 26:
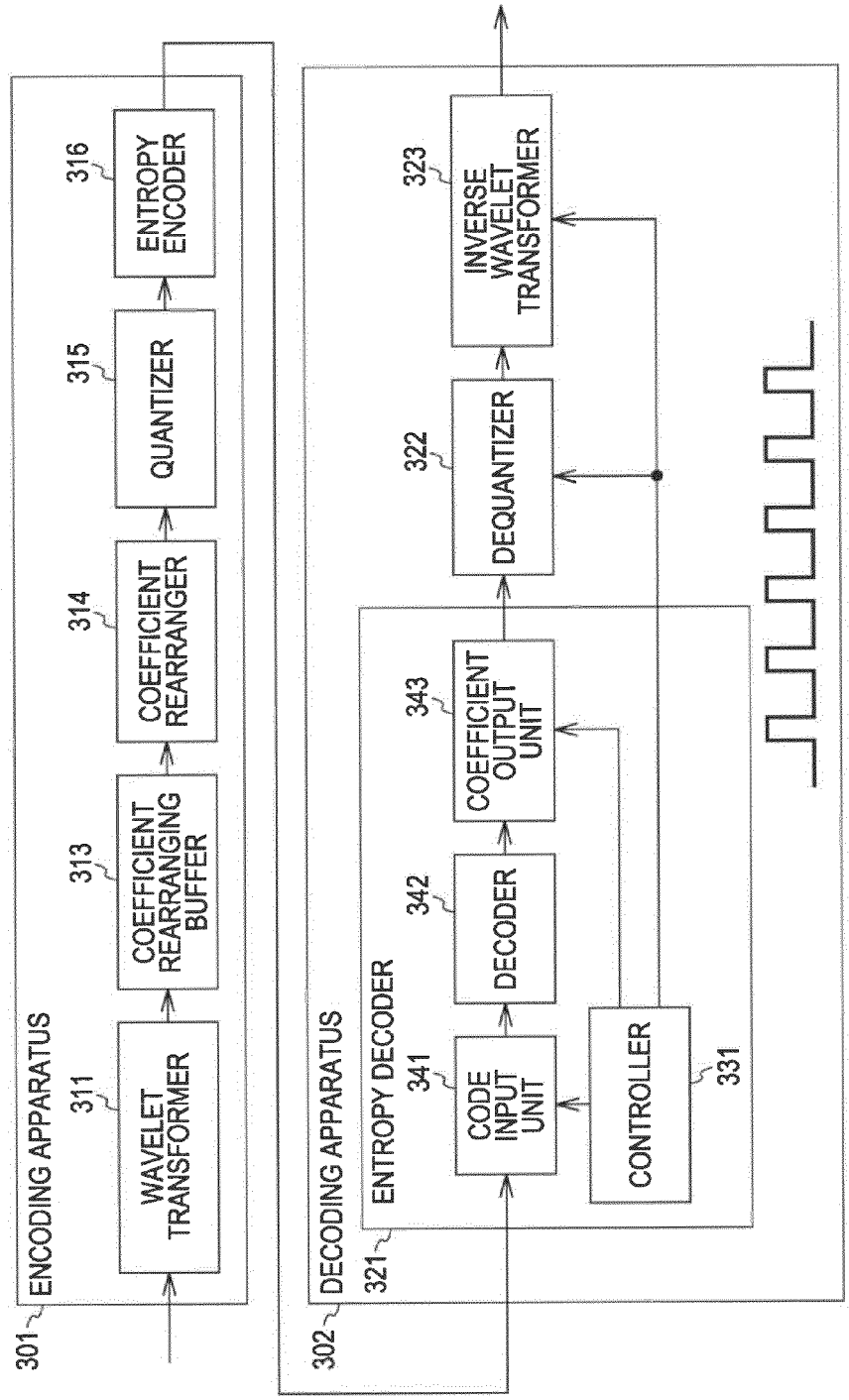
FIG. 26 is a block diagram illustrating an image transmission system using an inverse wavelet transforming apparatus in accordance with one embodiment of the present invention.

An application of the inverse wavelet transforming apparatus 100 is described below. FIG. 26 is a block diagram illustrating an image transmission system 300 including the inverse wavelet transforming apparatus 100 in accordance with one embodiment of the present invention.

The image transmission system 300 of FIG. 26 encodes image data in the data format of FIG. 25, and includes an encoding apparatus 301 as a source and a decoding apparatus 302 as a destination.

The encoding apparatus 301 encodes image data input from the outside and transmits the encoded data to the decoding apparatus 302. The encoding apparatus 301 includes a wavelet transformer 311, a coefficient rearranging buffer 313, a coefficient rearranger 314, a quantizer 315, and an entropy encoder 316.

The wavelet transformer 311 wavelet transforms into coefficient data the image data input from outside the encoding apparatus 301 into a wavelet coefficient in accordance with a method corresponding to the inverse wavelet transform of the inverse wavelet transforming apparatus 100 discussed with reference to FIGS. 1 through 4. The wavelet transformer 311 then stores the coefficient data onto the coefficient rearranging buffer 313. The coefficient rearranger 314 reads the coefficient data from the coefficient rearranging buffer 313 in the order of the inverse wavelet transform process. The rearranged coefficient data is then quantized by the quantizer 315, and then encoded by the entropy encoder 316. The resulting encoded data generated by the entropy encoder 316 is transmitted to the decoding apparatus 302.

The decoding apparatus 302 decodes and inverse wavelet transforms the encoded data transmitted from the encoding apparatus 301. The decoding apparatus 302 thus restores and outputs the baseband image data. The decoding apparatus 302 includes an entropy decoder 321, a dequantizer 322, and an inverse wavelet transformer 323. The encoded data transmitted from the encoding apparatus 301 is decoded by the entropy decoder 321, dequantized by the dequantizer 322, and then inverse wavelet transformed by the inverse wavelet transformer 323. The resulting baseband image data is thus output from the decoding apparatus 302.

The inverse wavelet transformer 323 corresponds to the inverse wavelet transforming apparatus 100, and is basically identical in structure and operation to the inverse wavelet transforming apparatus 100. The inverse wavelet transformer 323 thus performs the inverse wavelet transform, thereby outputting one line of the image data at a time in synchronization with the horizontal synchronization timing.

The entropy decoder 321 includes a controller 331, a code input unit 341, a decoder 342, and a coefficient output unit 343. The encoded data supplied to the entropy decoder 321 is received by the code input unit 341, and decoded into coefficient data by the decoder 342. The generated coefficient data is output via the coefficient output unit 343 to the dequantizer 322. By controlling the input and output portions of the decoder 342, namely, the code input unit 341 and the coefficient output unit 343, the controller 331 controls an execution timing of the decoding process of the decoder 342. The controller 331 supplies to each of the dequantizer 322 and the inverse wavelet transformer 323 a clock signal indicating a horizontal synchronization timing of the image data.

The decoder 342, the dequantizer 322, and the inverse wavelet transformer 323, under the control of the controller 331, perform the processes thereof so that the input encoded data may be decoded, dequantized, and inverse wavelet transformed. The baseband image data is thus output with one line at a time in synchronization with the horizontal synchronization timing.

Figure 27:
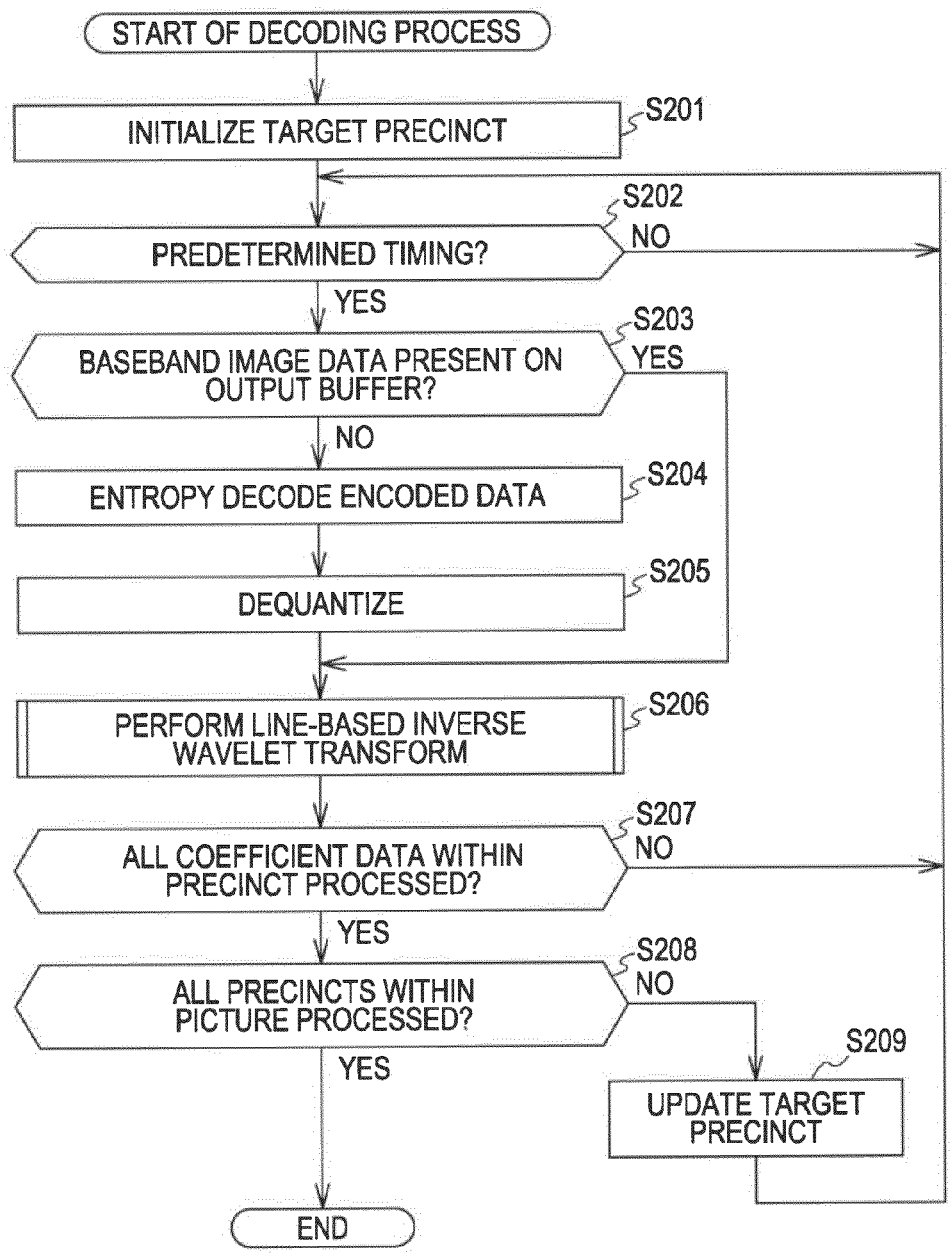
FIG. 27 is a flowchart illustrating a decoding process.

The decoding process of the decoding apparatus 302 is described below with reference to a flowchart of FIG. 27. The decoding process is repeated on a per picture basis.

When the decoding process is started, the controller 331 initializes a target precinct in step S201. In step S202, the controller 331 determines whether it is a predetermined timing corresponding to a horizontal blanking period (horizontal synchronization timing). The controller 331 waits on standby until it reaches the predetermined timing.

If it is determined in step S202 that it has reached the predetermined timing, processing proceeds to step S203.

In step S203, the controller 331 determines whether the baseband image data is preset on an output buffer in the inverse wavelet transformer 323. If it is determined in step S203 that no baseband image data is present on the output buffer in the inverse wavelet transformer 323, processing proceeds to step S204. In step S204, the decoder 342 acquires the encoded data via the code input unit 341 controlled by the controller 331 and converts the encoded data into the coefficient data through entropy decoding. The decoder 342 supplies the generated coefficient data to the dequantizer 322 via the coefficient output unit 343 controlled by the controller 331. In step S205, the dequantizer 322 dequantizes the coefficient data and supplies the dequantized coefficient data to the inverse wavelet transformer 323.

Subsequent to step S205, processing proceeds to step S206. If it is determined in step S203 that the baseband image data is present on the output buffer, the baseband image data is output first from the output buffer. Processing proceeds to step S206 with steps S204 and S205 skipped.

In step S206, the inverse wavelet transformer 323 performs the line-based inverse wavelet transform, as previously discussed with reference to the flowcharts of FIGS. 17 and 18, in response to a control timing supplied from the controller 331. The inverse wavelet transformer 323 thus generates and outputs two lines of the baseband image data.

In step S207, the controller 331 determines whether all coefficient data within the precinct has been processed. If it is determined in step S207 that unprocessed data remains, processing returns to step S202 to repeat step S202 and subsequent steps. If it is determined in step S207 that all coefficient data within the precinct has been processed, processing proceeds to step S208.

In step S208, the controller 331 determines whether all precincts within the picture have been processed. If it is determined in step S208 that any unprocessed precinct still remains, processing proceeds to step S209. In step S209, the controller 331 sets the target precinct to a next precinct, and returns to step S202. If it is determined in step S208 that all precincts within the picture have been processed, the controller 331 ends the decoding process on the picture.

As described above, the decoding apparatus 302 under the control of the controller 331 repeats the line-based inverse wavelet transform at the predetermined timing, namely, at the horizontal synchronization timing.

The decoding apparatus 302 outputs the coefficient data on a line-by-line basis in synchronization with the horizontal synchronization timing. More specifically, the decoding apparatus 302 decodes the encoded data on a real-time basis, thereby restoring the baseband image data.

Figure 28:
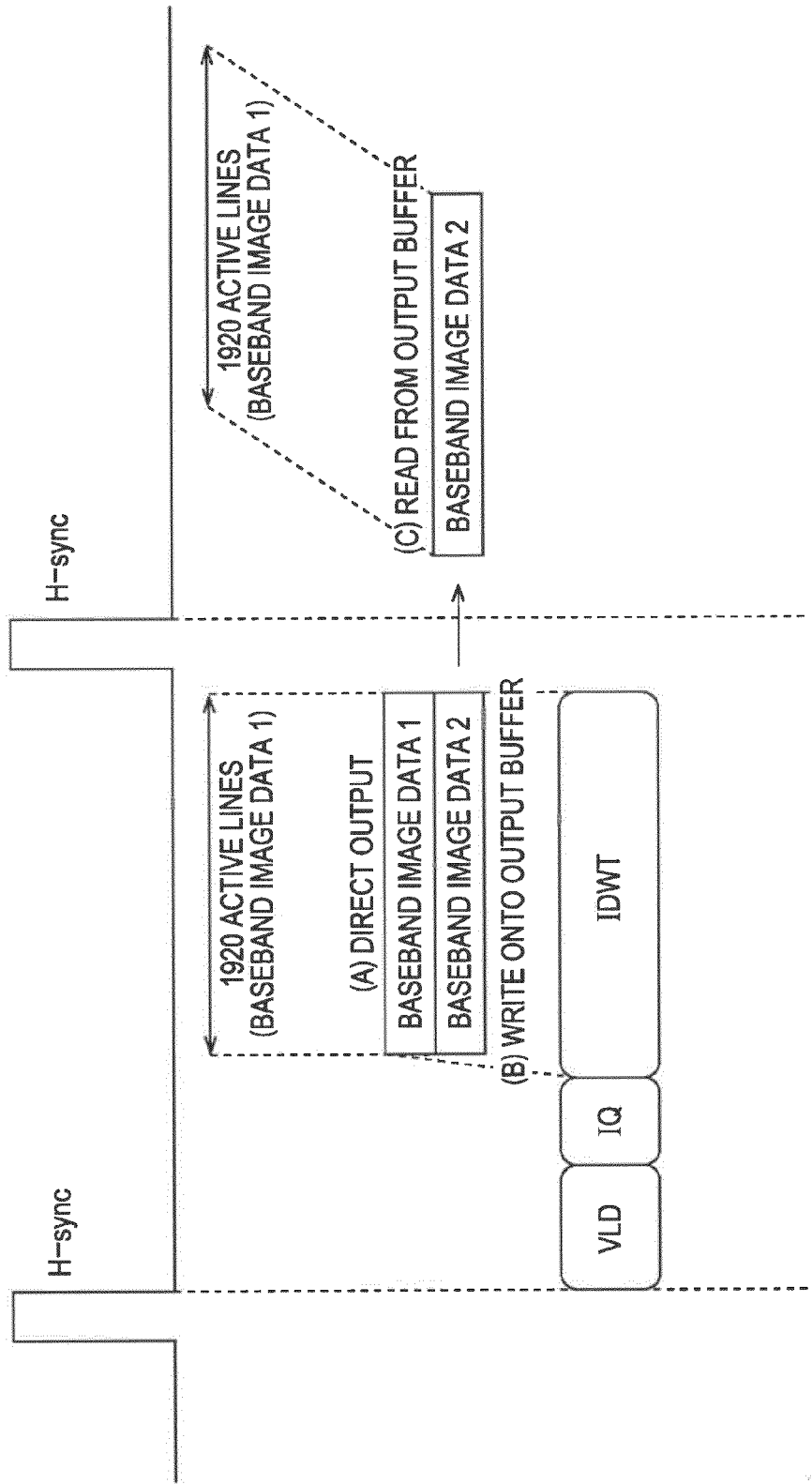
FIG. 28 is a timing diagram illustrating a process execution timing.

FIG. 28 diagrammatically illustrates how the baseband image data is output. As shown in FIG. 28, the baseband image data (baseband image data 1 and baseband image data 2) is output with one line at the horizontal synchronization timing (H-Sync). The baseband image data is generated with two lines at a time (baseband image data 1 and baseband image data 2). More specifically, one line of the generated two lines is directly output at the horizontal synchronization timing corresponding to the generation timing as labeled (A), and the other line is written onto the output buffer 116 as labeled (B). At a next horizontal synchronization timing, the other line is read and output from the output buffer 116 as labeled (C).

As shown in FIG. 28, an entropy decoding process (VLD), a dequantization process (IQ), and an inverse wavelet transform (IDWT) are performed within the horizontal synchronization period. The inverse wavelet transformer 323 (inverse wavelet transforming apparatus 100) performs the synthesis filtering operation in the order described above, thereby shortening the generation intervals of the baseband image data. The decoding process is thus preformed on a real-time basis at the timings shown in FIG. 28.

The image data transmission system has been discussed. The inverse wavelet transforming apparatus 100 in accordance with one embodiment of the present invention is applicable to another system. The inverse wavelet transforming apparatus 100 provides more benefit in a system that requires lower latency features.

In the above discussion, a part of the coefficient data generated in the synthesis filtering operation is stored on the output buffer 116 when the baseband image data is not stored in the inverse wavelet transforming apparatus 100. With this arrangement, an amount of data to be stored on the output buffer 116 is not increased while an amount data to be stored on the level-graded buffer section 120 is reduced. More specifically, an improved utilization efficiency of the cache memory buffering the coefficient data and the image data leads to a reduction in the memory capacity required of the buffer memory storing data in the inverse wavelet transform in the inverse wavelet transforming apparatus 100. The inverse wavelet transforming apparatus 100 thus controls overflow of the coefficient data and the image data (saving of the coefficient data and the image data onto an external memory). With no substantial increase in manufacturing costs, the inverse wavelet transform is performed easily at a high speed.

To benefit from the above features, the inverse wavelet transforming apparatus 100 includes the output buffer 116. Part of the coefficient data generated in the synthesis filtering operation is stored onto the output buffer 116 when no baseband image data is stored thereon. The structure and process other than this arrangement are optional. For example, the synthesis filtering operation may be performed at each segmentation level from the top level to the bottom level. The synthesis filtering operation performed to generate two lines of the baseband image data at a time reduces an amount data to be stored. In the above discussion, the wavelet transform and the encoding process are performed by precinct and the decoding process and the inverse wavelet transform are performed by precinct. Alternatively, the wavelet transform and the encoding process may be performed by picture and the decoding process and the inverse wavelet transform may be performed by picture. With each process performed by precinct, a lower latency in the inverse wavelet transform results and a memory capacity required of the buffer is reduced accordingly. The output buffer 116 of FIG. 14 may also be applicable to the above-described other structure and process and still provides equal advantages.

The inverse wavelet transforming apparatus 100 stores one of the two lines of coefficient data generated in the synthesis filtering operation and performs further the synthesis filtering operation on the other line. The inverse wavelet transforming apparatus 100 thus repeats the synthesis filtering operation from the top level to the bottom level. The stored coefficient data at a lower level is synthesis filtered with a higher priority in order to generate two lines of the block diagram at a time. An amount of coefficient data to be stored is thus reduced. The inverse wavelet transform is performed at a high speed with low latency involved. Each line of the baseband image data is output at shorter intervals. Cost increases are reduced.

The inverse wavelet transforming apparatus 100 stores one line of the two lines of coefficient data generated in the synthesis filtering operation and further performs the synthesis filtering operation on the other line. The inverse wavelet transforming apparatus 100 repeats such a synthesis filtering operation from the top level to the bottom level. The stored coefficient data at a lower level is synthesis filtered with a higher priority in order to generate two lines of the block diagram at a time. The structure and process other than this arrangement are optional. For example, the coefficient data may not be stored on the output buffer 116. But the use of the output buffer 116 designed to store the coefficient data reduces an increase in the memory capacity of the cache memory and controls an overflow of the coefficient data and the image data from the cache memory. Furthermore, without increasing the manufacturing costs, the inverse wavelet transform is performed easily at a high speed. The output buffer 116 of FIG. 14 may also be applicable to the above-described other structure and process and still provides equal advantages.

The above-described method steps may be executed using software or hardware. For example, a personal computer 400 of FIG. 29 may perform the above-described software programs.

Figure 29:
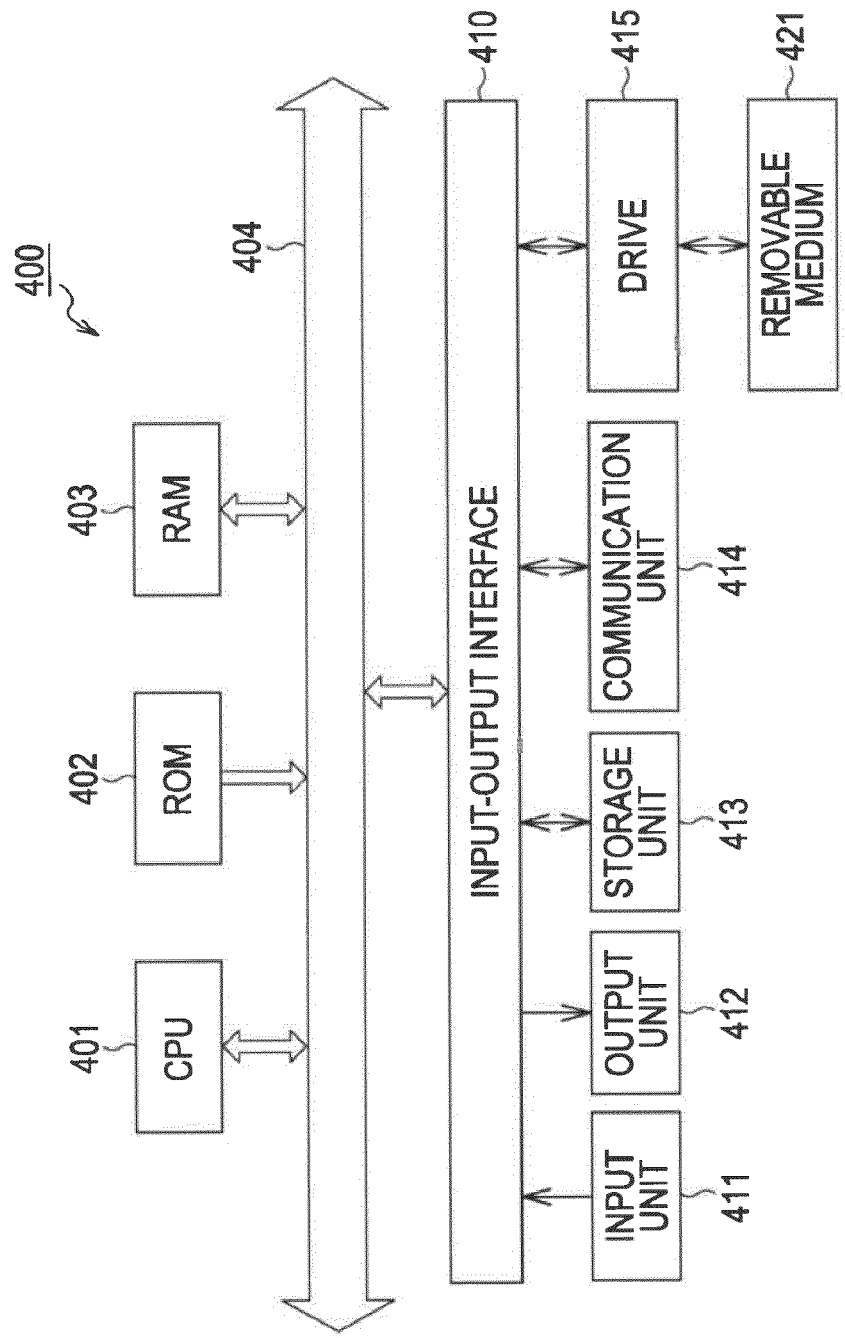
FIG. 29 illustrates a personal computer in accordance with one embodiment of the present invention.

A CPU 401 in the personal computer 400 of FIG. 29 performs a variety of processes in accordance with a program stored on a read-only memory (ROM) 402 or a program loaded onto a random-access memory (RAM) 403 from a storage unit 413. The RAM 403 stores, as necessary, data used for the CPU 401 to perform a variety of processes.

The CPU 401, the ROM 402 and the RAM 403 are connected to each other via a bus 404. The bus 404 connects to an input-output interface 410.

Also connected to the input-output interface 410 are an input unit 411 including a keyboard and a mouse, an output unit 412 including a display such as a cathode ray tube (CRT) or a liquid-crystal display (LCD) and a loudspeaker, a storage unit 413 including a hard disk, and a communication unit 414 including a modem. The communication unit 414 performs a communication process via a network such as the Internet.

The input-output interface 410 also connects to a drive 415, as necessary. A removable medium 421, such as one of a magnetic disk, an optical disk, a magneto-optical disk, and a semiconductor memory, is loaded on the drive 415. A computer program read from the removable medium 421 is installed onto the storage unit 413.

If the above-described series of method steps are performed using software, a program implementing the software is installed via the network or from a recording medium.

The recording medium may be the removable medium 421 of FIG. 29, storing the program and distributed separately from the host apparatus to supply the user with the program. The removable medium 421 may include one of a magnetic disk (including a flexible disk), an optical disk (compact-disk read-only memory (CD-ROM), a digital versatile disk (DVD) or the like), a magneto-optical disk (Mini-Disk (MD) (Registered Trademark)), and a semiconductor memory. The recording medium may also be one of the ROM 402 and a hard disk loaded onto the storage unit 413, each storing the program and supplied in the host apparatus to the user.

The above-described method steps describing the program recorded on the recording medium may be performed in the time-series sequence described above. Also, the above-described method steps may be performed in parallel or separately.

The word system refers to an entire apparatus composed a plurality of devices.

The apparatus described as a single unit may be divided into a plurality of apparatuses. Apparatuses described a plurality of units may be integrated into a single unit. Another arrangement may be attached to the structure of the above-described apparatus. If the structure and operation of the system remain unchanged, part of one apparatus may be integrated into another apparatus.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
synthesis filtering means for performing a synthesis filtering operation on image data so that frequency components of the image data at frequency bands of the same segmentation level are synthesized, the image data containing a plurality of frequency bands of a high-frequency component and a low-frequency component as a result of an analysis filtering operation performed in a layer fashion, the synthesized frequency components of the image data at frequency bands of the same segmentation level consisting of a first part and a second part;
frequency component storage means for storing, until the synthesis filtering means performs a next synthesis filtering operation, frequency components being synthesis filterable and at one-notch lower segmentation level than the frequency components at frequency bands of the same segmentation level which are to be synthesized by the synthesis filtering means in the next synthesis filtering operation;

image data storage means for storing, until an output timing of the image data, the image data generated and restored by the synthesis filtering means as a result of the synthesis filtering operation; and control means for causing the synthesis filtering means to perform recursively the synthesis filtering operation on the frequency components stored in the frequency component storage means, causing the frequency component storage means to store the first part of the synthesized frequency components generated by the synthesis filtering means, causing the image data storage means to store the second part of the synthesized frequency components and then causing the image data storage means to move the second part of the synthesized frequency components to the frequency component storage means after the synthesis filtering means completes the next synthesis filtering operation with the first part of the synthesized frequency components, wherein the first and second parts of the synthesized frequency components respectively correspond to first and second lines of the frequency components at a one-notch lower segmentation level and at the same segmentation level, and wherein the control means causes the frequency component storage means to store the first of the two lines generated by the synthesis filtering means and causes the image data storage means to store the second line.

2. The information processing apparatus according to claim 1, wherein the synthesis filtering means comprises vertical synthesis filtering means for performing the synthesis filtering operation on the frequency components of the image data in an image vertical direction, and horizontal synthesis filtering means for performing the synthesis filtering operation on the frequency components of the image data in an image horizontal direction.

3. The information processing apparatus according to claim 1, wherein the control means causes the synthesis filtering means to perform the synthesis filtering operation on the frequency component stored in the frequency component storage means with a higher priority.

4. The information processing apparatus according to claim 1, wherein the control means causes the synthesis filtering means to perform the synthesis filtering operation on a frequency component at a lower segmentation level with a higher priority, from among the frequency components stored on the frequency component storage means.

5. The information processing apparatus according to claim 1, wherein the control means causes a first of two lines of the image data generated in the synthesis filtering operation by the synthesis filtering means to be output to outside and causes a second of the two lines to be stored on the image data storage means until a next output timing.

6. The information processing apparatus according to claim 1, wherein the control means causes the image data storage means to store the second line of the frequency components generated by the synthesis filtering means during a period throughout which no image data is stored in the image data storage means, and moves the second line of frequency components from the image data storage means to the frequency component storage means when a next line of the image data generated by the synthesis filtering means is stored in the image data storage means.

7. The information processing apparatus according to claim 1, wherein the image data storage means comprises:
storage means for writing and reading data via a one-port connection;

data concatenation means for concatenating a plurality of pieces of data consecutively supplied and storing the concatenated data as a single piece of data into the storage means; and data deconcatenation means for deconcatenating the single piece of data into a plurality of pieces of data and outputting consecutively the plurality of pieces of data, wherein the control means causes the data concatenation means and the data deconcatenation means to perform alternately a read operation and a write operation into the storage means by a predetermined data unit.

8. The information processing apparatus according to claim 1, wherein the frequency component storage means stores separately the frequency components on a per segmentation level basis.

9. An image processing method, comprising steps of:
performing a synthesis filtering operation on image data so that frequency components of the image data at frequency bands at the same segmentation level are synthesized, the image data containing a plurality of frequency bands of a high-frequency component and a low-frequency component as a result of an analysis filtering operation performed in a layer fashion, the synthesized frequency components of the image data at frequency bands of the same segmentation level consisting of a first part and a second part, the first and second parts of the synthesized frequency components respectively corresponding to first and second lines of the frequency components at a one-notch lower segmentation level and at the same segmentation level;

storing in a frequency component storage unit the first part of frequency components, the frequency components being synthesis filterable and at one-notch lower segmentation level than next frequency components at the frequency bands of the same segmentation level which are to be synthesized in a next synthesis filtering operation, the storing further storing, in the frequency component storage unit, the first of the two lines generated by the synthesis filtering operation;

storing the second part of the frequency component in an image data storage unit, the storing further storing, in the image data storage unit, the second line of the two lines generated by the synthesis filtering operation;

performing recursively the synthesis filtering operation on the frequency components stored on the frequency component storage unit until the image data is restored;

storing on the image data storage unit, until an output timing of the image data, the image data generated and restored in the synthesis filtering operation; and moving the second part of the frequency components from the image data storage unit to the frequency component storage unit when the image data is stored into the image data storage unit.

10. An information processing apparatus, comprising:
a synthesis filtering unit performing a synthesis filtering operation on image data so that frequency components of the image data at frequency bands at the same segmentation level are synthesized, the image data containing a plurality of frequency bands of a high-frequency component and a low-frequency component as a result of an analysis filtering operation performed in a layer fashion, the synthesized frequency components of the image data at frequency bands of the same segmentation level consisting of a first part and a second part;

a frequency component storage unit storing, until the synthesis filtering unit performs a next synthesis filtering operation, frequency components being synthesis filterable and at one-notch lower segmentation level than the frequency components at frequency bands of the same segmentation level which are to be synthesized by the synthesis filtering unit in the next synthesis filtering operation;

an image data storage unit storing, until an output timing of the image data, the image data generated and restored by the synthesis filtering unit as a result of the synthesis filtering operation; and a control unit causing the synthesis filtering unit to perform recursively the synthesis filtering operation on the frequency components stored on the frequency component storage unit, causing the frequency component storage unit to store the first part of the synthesized frequency components generated by the synthesis filtering unit, causing the image data storage unit to store the second part of the synthesized frequency components and then causing the image data storage means to move the second part of the synthesized frequency components to the frequency component storage unit after the synthesis filtering unit completes the next synthesis filtering operation with the first part of the synthesized frequency components, wherein the first and second parts of the synthesized frequency components respectively correspond to first and second lines of the frequency components at a one-notch lower segmentation level and at the same segmentation level, and wherein the control unit causes the frequency component storage unit to store the first of the two lines generated by the synthesis filtering unit and causes the image data storage unit to store the second line.

* * * * *